(12) United States Patent
Diosady et al.

(10) Patent No.: US 8,048,463 B2
(45) Date of Patent: *Nov. 1, 2011

(54) PRODUCTION OF HIGH-QUALITY PROTEIN ISOLATED FROM OIL SEEDS

(76) Inventors: Levente Laszlo Diosady, Willowdale (CA); Lei Xu, Ottawa (CA); Bih-King Chen, Toronto (CA)

( * ) Notice: Subject to any disclaimer, the term of this patent is extended or adjusted under 35 U.S.C. 154(b) by 812 days.

This patent is subject to a terminal disclaimer.

(21) Appl. No.: 11/685,392

(22) Filed: Mar. 13, 2007

(65) Prior Publication Data

US 2007/0237877 A1 Oct. 11, 2007

Related U.S. Application Data

(63) Continuation-in-part of application No. 11/122,037, filed on May 5, 2005, now abandoned, which is a continuation of application No. 10/155,226, filed on May 28, 2002, now Pat. No. 6,905,713.

(60) Provisional application No. 60/294,520, filed on May 29, 2001.

(51) Int. Cl.
*A23L 2/52* (2006.01)
*A23L 2/66* (2006.01)

(52) U.S. Cl. ........ 426/481; 424/755; 424/776; 426/590; 426/599; 426/656

(58) Field of Classification Search .................. 426/590, 426/580, 599, 656, 481
See application file for complete search history.

(56) References Cited

U.S. PATENT DOCUMENTS

| 2,732,395 A | * | 1/1956 | Bolley et al. ................. 558/147 |
| 3,770,453 A | | 11/1973 | Dadic et al. |
| 3,935,281 A | | 1/1976 | Cottman |

(Continued)

FOREIGN PATENT DOCUMENTS

FR 2760751 9/1998

OTHER PUBLICATIONS

L.L. Diosady, Y.M. Tzeng, and L.J. Rubin. Preparation of Rapeseed Protein Concentrates and Isolates Using Ultrafiltration. Journal of Food Science, vol. 49 (1984), pp. 768-770, 776.

(Continued)

*Primary Examiner* — Helen F Heggestad
(74) *Attorney, Agent, or Firm* — Bereskin & Parr LLP S.E.N.C.R.L., s.r.l.; Philip C. Mendes da Costa

(57) ABSTRACT

The present invention provides a method for processing defatted oil seeds, comprising the steps of: (a) solubilizing at least a portion of the protein contained in the oil seeds to produce suspended residual solids and a first solution comprising protein, phenolic-protein complexes, and free phenolic compounds; (b) treating at least a portion of the phenolic-protein complexes in the first solution to liberate at least some phenolic compounds from the phenolic-protein complexes thereby producing a second solution; (c) separating at least a portion of the free phenolic compounds from the second solution and recovering a free phenolic reduced solution; and (d) treating the free phenolic reduced solution to precipitate at least a portion of the protein as a precipitated protein isolate and recovering a treated solution containing a soluble protein isolate. Novel protein products are also disclosed. Food and drink products containing the novel protein products are also disclosed.

9 Claims, 7 Drawing Sheets

U.S. PATENT DOCUMENTS

| | | | |
|---|---|---|---|
| 3,993,636 | A | 11/1976 | Maubois et al. |
| 4,138,500 | A | 2/1979 | Fulger et al. |
| 4,158,656 | A | 6/1979 | Jones et al. |
| 4,212,799 | A | 7/1980 | Nuzzolo et al. |
| 4,420,425 | A | 12/1983 | Lawhorn |
| 4,889,921 | A * | 12/1989 | Diosady et al. ............... 530/377 |
| 5,086,166 | A | 2/1992 | Lawhon et al. |
| 5,248,804 | A * | 9/1993 | Nardelli et al. ............... 558/147 |
| 5,858,449 | A * | 1/1999 | Crank et al. ................... 426/656 |
| 6,905,713 | B2 * | 6/2005 | Diosady et al. ............... 424/755 |

OTHER PUBLICATIONS

Yew-Min Tzeng, Levente L. Diosady, and Leon J. Rubin. Production of Canola Protein Materials by Alkaline Extraction, Precipitation, and Membrane Processing. Journal of Food Science, vol. 55, No. 4 (1990), pp. 1147-1151, 1156.

L. Xu, L.L. Diosady. Interactions Between Canola Proteins and Phenolic Compounds in Aqueous Media. Food Research International 33 (2000), pp. 725-731.

L. Xu, L.L. Diosady. Removal of Phenolic Compounds in the Production of High-Quality Canola Protein Isolates. Food Research International 35 (2002), pp. 23-30.

Aruna Venkatesh and A.G. Appu Rao. Isolation and Characterization of Low Molecular Weight Protein From Mustard (Brassica juncea). Journal of Agric. Food Chem., vol. 36, No. 6 (1988), pp. 1150-1155.

David J. Sessa and Jerold A. Bietz. Toasted Soybean Flour Components with Trypsin Inhibitor Activity. JOACS, vol. 63, No. 6 (Jun. 1986), pp. 784-788.

Malakiba Sen and Dipak Jumar Bhattacharyya. Nutritional Effects of Mustard Seed Protein Detoxified with Aqueous Isopropanol in Young Rats. Eur. J. of Lipid Sci. Technol., 102 (2000), pp. 727-733.

* cited by examiner

PRODUCTION OF HIGH-QUALITY PROTEIN ISOLATED FROM OIL SEEDS

RELATED APPLICATIONS

This application is a continuation-in-part of U.S. application Ser. No. 11/122,037 filed on May 5, 2005, which is a continuation of U.S. application Ser. No. 10/155,226 filed on May 28, 2002, issued as U.S. Pat. No. 6,905,713, which claims the benefit of U.S. Provisional Application No. 60/294,520 filed May 29, 2001. The disclosures of U.S. application Ser. Nos. 11/122,037, 10/155,226 and 60/294,520 are incorporated herein, in their entirety, by this reference to them.

FIELD

The present invention relates to protein products derived from oil seeds, and to methods for producing and using same.

BACKGROUND

The following paragraphs are not an admission that anything discussed in them is prior art or part of the knowledge of persons skilled in the art.

*Brassica* seeds, including rapeseed, canola and mustard seeds, are a potential source of high quality protein suitable for human consumption. The defatted meals that can be obtained from these seeds contain about 40% w/w protein with a well-balanced amino acid composition, and have excellent functional properties. However, the use of *Brassica* seeds as a protein source is limited by the presence of certain undesirable toxic and anti-nutritional components, including glucosinolates, phytates, and phenolic compounds. The concentration of these undesirable components must be substantially reduced before these types of protein isolates are suitable for human consumption.

Glucosinolates are hydrolyzed in enzymatic reactions to form compounds that can interfere with thyroid function and cause liver and kidney damage at high concentrations. Phytates are strong chelating agents that bind to polyvalent metal ions in the body including iron, calcium and magnesium, rendering them unavailable for metabolism. Phenolic compounds impart an unpleasant bitter taste and a dark colour to the final protein products.

Phenolic compounds are particularly difficult to remove because some of the phenolics bind to the proteins in an aqueous media to form relatively large phenolic-protein complexes. Xu and Diosady (Food Res. Intl. 33:725 2000) characterized the canola protein-phenolic interactions in an aqueous media, using a series of chemical treatments followed by membrane separations. The results suggested that approximately 50% of the total extracted phenolic compounds formed complexes with canola proteins through ionic bonding (~30%), hydrophobic interactions (<10%), hydrogen bonding (<10%), and covalent bonding (<10%). Although these figures may seem minor, if not removed, they could be concentrated to high phenolic compound levels in the protein isolates which represent only a small fraction of the meal mass.

In U.S. Pat. No. 4,889,921, Diosady et al. discloses a process for the production of protein isolates from rapeseed, including the steps of alkaline extraction and isoelectric precipitation to obtain a precipitate from which a first product stream of protein is recovered. The depleted solution from the precipitation stage is subjected to ultrafiltration followed by diafiltration and drying to obtain a second product stream of recovered protein. These two protein isolates were produced with a combined protein recovery of over 70% of the protein present in the seed. Both products were of high protein content (>90%), essentially free of glucosinolates (<2 mol/g), low in phytates (<1%), and had desirable functional properties for a variety of food applications. However, both of the protein isolates had an unpleasant bitter taste and a dark colour. These unacceptable organoleptic properties were attributable to the phenolic compounds that were left behind in the protein isolates.

In the U.S. Pat. No. 4,889,921 patent, membrane processes are used to concentrate and purify the protein isolates. These processes separate dissolved components on the basis of their molecular sizes. Specifically, the membranes reject and retain large molecules in the retentate, while allowing small molecules (impurities) to pass through into the permeate. These processes are effective at removing the glucosinolates and the phytates, as they are relatively small and pass through the pores of the membrane. However, the relatively large phenolic-protein complexes tend to be rejected by the membrane, and thus remain behind in the retentate along with the protein isolates. Further, the precipitate from the precipitation stage also includes phenolics and bound phenolics.

There still exists an ongoing need for a method for producing protein isolates derived from *Brassica* oil seeds that have low concentrations of glucosinolates, phytates and phenolic compounds.

Introduction

The following introduction is intended to introduce the reader to this specification but not to define any invention. One or more inventions may reside in a combination or sub-combination of the apparatus elements or process steps described below or in other parts of this document. The inventor does not waive or disclaim his rights to any invention or inventions disclosed in this specification merely by not describing such other invention or inventions in the claims.

The present invention provides a method for processing defatted oil seeds, comprising the steps of:

(a) solubilizing at least a portion of the protein contained in the oil seeds to produce suspended residual solids and a first solution comprising protein, phenolic-protein complexes, and free phenolic compounds;

(b) separating at least a portion of the free phenolic compounds from the first solution and recovering a free phenolic reduced solution; and (c) treating the free phenolic reduced solution to precipitate at least a portion of the protein as a precipitated protein isolate and recovering a treated solution containing a soluble protein isolate.

In one embodiment of the invention, the step of treating the free phenolic reduced solution to precipitate at least a portion of the protein comprises reducing the pH of the free phenolic reduced solution to form the precipitate.

In another embodiment of the invention, the step of separating at least a portion of the free phenolic compounds from the first solution comprises subjecting the first solution to membrane filtration to obtain the free phenolic reduced solution. Preferably, the membrane filtration comprises at least one of ultrafiltration, diafiltration and reverse osmosis.

In another embodiment of the invention, the method further comprises the step of treating at least a portion of the phenolic-protein complexes in the first solution in at least one point prior to step (b) to liberate at least some phenolic compounds from the phenolic-protein complexes.

In another embodiment of the invention, the step of treating the first solution comprises adding at least one salt to liberate at least a portion of the phenolic compounds from the phenolic-protein complexes.

In another embodiment of the invention the step of treating the first solution comprises the step of heating the first solution to liberate at least a portion of the phenolic compounds from the phenolic-protein complexes.

In one aspect of the invention, the temperature of the first solution is increased to between about 40° C. to about 75° C. In another aspect of the invention, the first solution is maintained at the increased temperature for a period of between about 10 to 180 minutes.

In another embodiment of the invention, the step of treating the first solution comprises adding at least one salt to liberate at least a portion of the phenolic compounds from the phenolic-protein complexes and the step of heating the first solution to liberate at least a portion of the phenolic compounds from the phenolic-protein complexes.

In another embodiment of the invention, the method further comprises the step of adding a surfactant to the first solution in at least one point prior to step (b) to liberate at least a portion of the phenolic compounds from the phenolic-protein complexes.

In another embodiment of the invention, the method further comprises the step of the adding a reducing agent to the first solution in at least one point prior to step (b) to inhibit the oxidation of at least a portion of the phenolic compounds.

In another embodiment of the invention, the method further comprises the steps of adding polyvinylpyrrolidone to the treated solution downstream of step (b) to adsorb at least a portion of the free phenolic compounds and removing the polyvinylpyrrolidone from the treated solution.

In another embodiment of the invention, the method further comprises the step of recovering at least a portion of the soluble protein isolate.

In another embodiment of the invention, the method further comprises the step of separating at least a portion of the suspended residual solids from the first solution prior to step (b), whereby a meal residue is obtained.

It will be appreciated that one or more of the above embodiments may be combined to obtain a method in accordance with the present invention.

The present invention also provides for a novel protein isolate comprising protein derived from mustard seeds. In one aspect of the invention, the mustard protein isolates may contain less than about 1% w/w phenolic compounds, preferably less than about 0.5% w/w phenolic compounds, more preferably less than about 0.2% w/w phenolic compounds, and most preferably less than about 0.02% w/w phenolic compounds.

In one aspect of the invention, the protein isolate is a precipitated protein isolate with protein in the range of between about 80% to about 110% w/w (N×6.25).

In another aspect of the invention, the protein isolate is a soluble protein isolate with protein in the range of between about 80% to about 110% w/w (N×6.25).

The present invention provides a protein isolate comprising protein derived from oil seeds when made by a method in accordance with the present invention comprising the steps of:
(a) solubilizing at least a portion of the protein contained in the oil seeds to produce suspended residual solids and a first solution comprising protein, phenolic-protein complexes, and free phenolic compounds;
(b) separating at least a portion of the free phenolic compounds from the first solution and recovering a free phenolic reduced solution; and
(c) treating the free phenolic reduced solution to precipitate at least a portion of the protein as a precipitated protein isolate and recovering a treated solution containing a soluble protein isolate.

In one aspect of the invention, the oil seeds are *Brassica* seeds.

In another aspect of the invention, the oil seeds are chosen from one of canola seeds, rapeseeds or mustard seeds.

In another aspect of the invention, the oil seeds are mustard seeds.

In one aspect of the invention, the protein contains less than about 1% w/w phenolic compounds, preferably less than about 0.5% w/w phenolic compounds, more preferably less than about 0.2% w/w phenolic compounds, and most preferably less than about 0.02% w/w phenolic compounds.

The present invention provides a protein isolate comprising protein derived from oil seeds when made by a method in accordance with the present invention comprising the steps of:
(a) solubilizing at least a portion of the protein contained in the oil seeds to produce suspended residual solids and a first solution comprising protein, phenolic-protein complexes, and free phenolic compounds;
(b) treating at least a portion of the phenolic-protein complexes in the first solution to liberate at least some phenolic compounds from the phenolic-protein complexes;
(c) separating at least a portion of the free phenolic compounds from the first solution and recovering a free phenolic reduced solution; and
(d) treating the free phenolic reduced solution to precipitate at least a portion of the protein as a precipitated protein isolate and recovering a treated solution containing a soluble protein isolate.

In one aspect of the invention, the oil seeds are *Brassica* seeds

In another aspect of the invention, the oil seeds are chosen from one of canola seeds, rapeseeds or mustard seeds.

In another aspect of the invention, the oil seeds are mustard seeds.

In one aspect of the invention, the protein contains less than about 1% w/w phenolic compounds, preferably less than about 0.5% w/w phenolic compounds, more preferably less than about 0.2% w/w phenolic compounds, and most preferably less than about 0.02% w/w phenolic compounds.

The present invention provides a protein isolate comprising protein derived from oil seeds when made by a method in accordance with the present invention comprising the steps of:
(a) solubilizing at least a portion of the protein contained in the oil seeds to produce suspended residual solids and a first solution comprising protein, phenolic-protein complexes, and free phenolic compounds;
(b) adding at least one salt to the first solution to liberate at least some phenolic compounds from the phenolic-protein complexes;
(c) separating at least a portion of the free phenolic compounds from the first solution and recovering a free phenolic reduced solution; and
(d) treating the free phenolic reduced solution to precipitate at least a portion of the protein as a precipitated protein isolate and recovering a treated solution containing a soluble protein isolate.

In one aspect of the invention, the oil seeds are *Brassica* seeds.

In another aspect of the invention, the oil seeds are chosen from one of canola seeds, rapeseeds or mustard seeds.

In another aspect of the invention, the oil seeds are mustard seeds.

In one aspect of the invention, the protein contains less than about 1% w/w phenolic compounds, preferably less than about 0.5% w/w phenolic compounds, more preferably less than about 0.2% w/w phenolic compounds, and most preferably less than about 0.02% w/w phenolic compounds.

The present invention provides a protein isolate comprising protein derived from oil seeds when made by a method in accordance with the present invention comprising the steps of:
- (a) solubilizing at least a portion of the protein contained in the oil seeds to produce suspended residual solids and a first solution comprising protein, phenolic-protein complexes, and free phenolic compounds;
- (b) heating the first solution to liberate at least some phenolic compounds from the phenolic-protein complexes;
- (c) separating at least a portion of the free phenolic compounds from the first solution and recovering a free phenolic reduced solution; and
- (d) treating the free phenolic reduced solution to precipitate at least a portion of the protein as a precipitated protein isolate and recovering a treated solution containing a soluble protein isolate.

In one aspect of the invention, the oil seeds are *Brassica* seeds.

In another aspect of the invention, the oil seeds are chosen from one of canola seeds, rapeseeds or mustard seeds.

In another aspect of the invention, the oil seeds are mustard seeds.

In one aspect of the invention, the protein contains less than about 1% w/w phenolic compounds, preferably less than about 0.5% w/w phenolic compounds, more preferably less than about 0.2% w/w phenolic compounds, and most preferably less than about 0.02% w/w phenolic compounds.

The present invention also provides for a food product suitable for human consumption, comprising a protein derived from mustard seeds. In one aspect of the invention, the protein contains less than about 1% w/w phenolic compounds, preferably less than about 0.5% w/w phenolic compounds, more preferably less than about 0.2% w/w phenolic compounds, even more preferably less than about 0.1% w/w phenolic compounds, and most preferably less than about 0.02% w/w phenolic compounds.

In one embodiment of the present invention, the food product is a processed meat product.

In another embodiment of the present invention, the food product is a vegetarian meat substitute.

In another embodiment of the present invention, the food product is a bakery product.

In another embodiment of the present invention, the food product is a nutritional supplement.

In another embodiment of the present invention, the food product is an infant formulation.

In another embodiment of the present invention, the food product is a bar.

In another embodiment of the present invention, the food product is a drink.

The present invention also provides for a food product suitable for human consumption, comprising a carbonated drink comprising a soluble protein isolate derived from oil seeds.

In one aspect of the invention, the oil seeds are preferably *Brassica* oil seeds, more preferably oil seeds chosen from one of canola seeds, rapeseeds, or mustard seeds, and most preferably mustard seeds.

In another aspect of the invention, the soluble protein isolate contain less than about 1% w/w phenolic compounds, preferably less than about 0.5% w/w phenolic compounds, more preferably less than about 0.2% w/w phenolic compounds, and most preferably less than about 0.02% w/w phenolic compounds.

BRIEF DESCRIPTION OF THE DRAWINGS

For a better understanding of the present invention, and to show more clearly how it may be carried into effect, reference will now be made, by way of example, to the accompanying drawings, which show a preferred embodiment of the present invention and in which.

DETAILED DESCRIPTION

Figure 1:
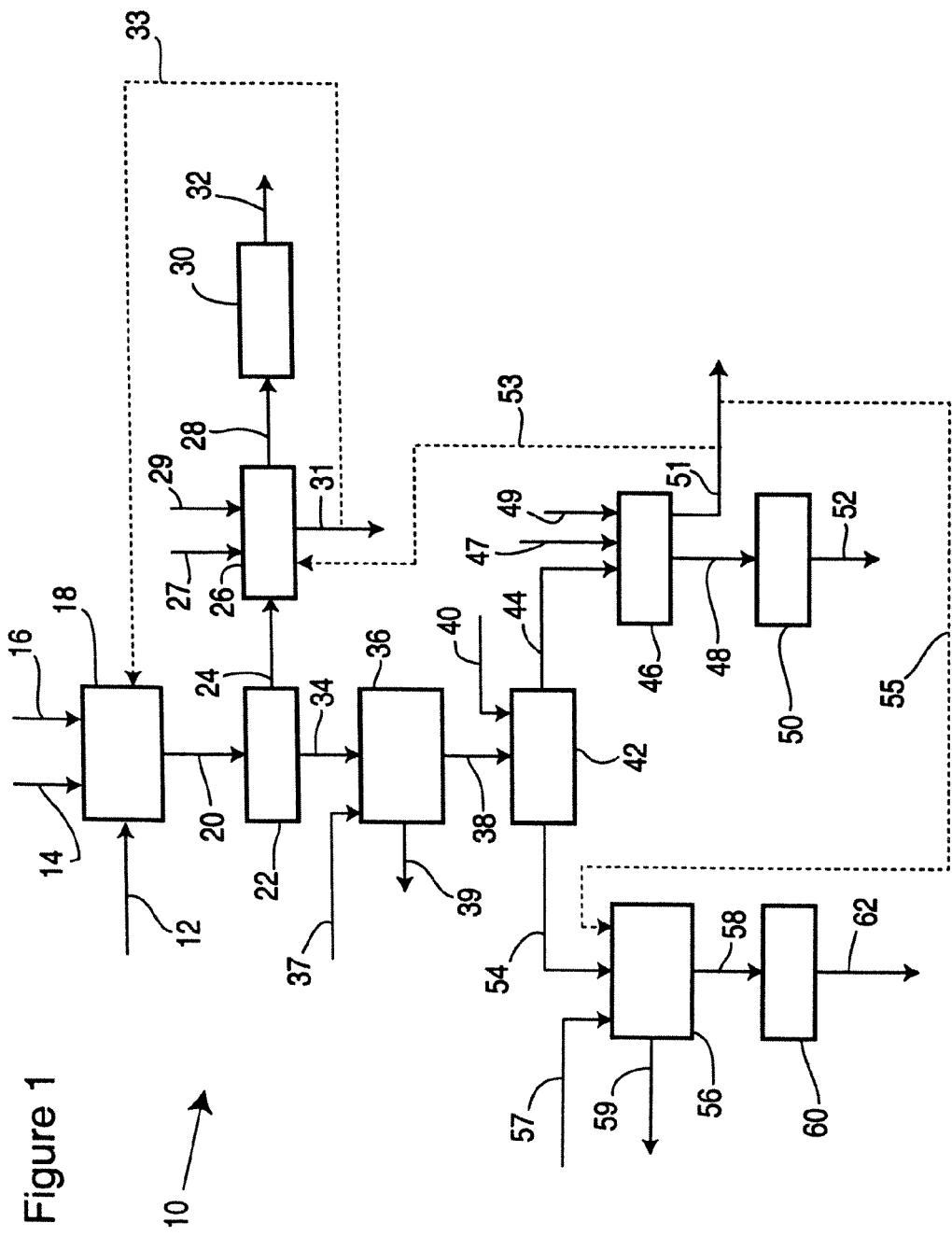
FIG. 1 is a process flow sheet in accordance with a first embodiment of the present invention.

Various apparatuses or methods will be described below to provide an example of an embodiment of each claimed invention. No embodiment described below limits any claimed invention and any claimed invention may cover methods or apparatuses that are not described below. The claimed inventions are not limited to apparatuses or methods having all of the features of any one apparatus or method described below or to features common to multiple or all of the apparatuses described below. It is possible that an apparatus or method described below is not an embodiment of any claimed invention. The applicants, inventors and owners reserve all rights in any invention disclosed in an apparatus or method described below that is not claimed in this document and do not abandon, disclaim or dedicate to the public any such invention by its disclosure in this document.

The present invention may be used to process any type of oil seeds. Examples of oil seeds include, but are not limited to, soy, ricebran, sunflower, peanuts, colza, *crambe*, lupins, corn, safflower and cotton seeds. The starting material is preferably any type of *Brassica* oil seed, more preferably rapeseed, canola, and mustard seeds, and most preferably mustard seeds.

One particularly preferred oil seed for use in this process is rapeseed. A disadvantage to the use of rapeseed is that it contains about 10 times the quantity of phenolic compounds found in soybean. Most phenolic compounds commonly identified in canola are phenolic acids and condensed tannins, which are polymeric phenolics based on flavonoids. The major phenolic component in rapeseed and canola was reported to be sinapine, which is the choline ester of sinapic acid. It constitutes about 1% of the meal mass, well above the taste thresholds of the phenolic acids in oilseed meals (about 40-500 ppm). Condensed tannins as polymeric phenolics may cause astringency due to their ability to precipitate proteins in the mouth. Under alkaline conditions such as in the process of Diosady, phenolic compounds readily undergo enzymatic and non-enzymatic oxidation to form quinones that can then react with proteins, resulting in a dark green or brown colour in the protein solutions. When these proteins are precipitated at their isoelectric points, the dark colours cannot be washed from the protein isolates.

Another particularly preferred oil seed for use in this process is mustard seeds. There are three distinct types of mustard seeds, which include *Brassica Hirta*, which is also known as *Brassica Alba, Brassica Nigra* and *Brassica Juncea*. Advantages to the use of mustard are that it is a spice that is widely accepted in the food industry, and is substantially free of soy allergens. Mustard seeds are readily available in commercial quantities, and are preferably available free of genetically modified organisms i.e. GMO-free. Mustard seeds have unique solubility properties, and a good amino acid distribution.

The glucosinolates present in mustard seeds tend to be simple in composition and are more labile; that is, they are readily broken down by heating or chemical treatment to compounds that are more acceptable in taste than those formed in other types of *Brassica* seeds.

Referring first to FIG. 1, a process flow sheet in accordance with a first embodiment of the present invention is shown generally at 10. Most of the oil is preferably extracted by standard industrial or laboratory techniques such as pre-pressing, followed by solvent extraction, typically by hexane. Preferably, the starting meal contains less than about 5% w/w oil, and more preferably contains less than about 1% w/w oil. The starting meal may either be hulled defatted oil seeds or dehulled defatted oil seeds In this embodiment, the starting meal (i.e. the treated oil seeds), an aqueous solvent, e.g. water, and a base are introduced into an extraction and washing zone 18 such as via lines 12, 14, and 16 respectively simultaneously or sequentially. If the process is operated on a continuous basis, then the starting meal, water and a base are preferably fed simultaneously to extraction and washing zone 18 via one or more feed streams. Alternatively, it is understood that two or more of the starting meal, water and base may be premixed and added to extraction and washing zone 18 via a single line.

The base may be any base suitable for extracting proteins from the starting meal. The base may be any food grade basic salt or aqueous alkali solution. Suitably, the extraction solution, namely the solution used to extract the protein is prepared by combining the aqueous solution and the base. The base may be an alkaline compound such as one or more of sodium hydroxide (NaOH), ammonium hydroxide ($NH_4OH$), potassium hydroxide (KOH), calcium oxide (CaO) or calcium hydroxide $Ca(OH)_2$. A particularly preferred base is NaOH.

In the extraction and washing zone 18, at least a portion of the proteins are dissolved to produce suspended residual solids and a spent or used extraction solution (first solution) comprising, protein, free phenolic compounds and phenolic-protein complexes. The spent extraction solution may also comprise other components including carbohydrates and sterols that are extracted from the starting meal inherently due to the extractant that is used. In one aspect of the invention, the extraction and washing zone 18 comprises a single stage.

The starting meal is preferably mixed with the aqueous solvent, for example water or water and a base, at a solvent to meal ratio ranging from about 3:1 to about 30:1, more preferably from about 12:1 to about 18:1, and most preferably about 15:1.

In another embodiment of the invention, the extraction and washing zone 18 comprises two or more consecutive stages. In this aspect of the invention, the first stage has a solvent to meal ratio of ranging from about 5:1 to about 30:1, more preferably from about 12:1 to about 18:1, and most preferably about 15:1, and the second stage has a solvent to meal ratio ranging from about 1:1 to about 10:1, more preferably from about 3:1 to about 8:1, and most preferably about 6:1. The use of consecutive stages tends to increase the concentration of the dissolved protein in the spent extraction solution. It is understood that the extraction and washing zone 18 may comprise two or more sequential stages, each stage of which may comprise one or more reactants. In each stage one or more reactors may be operated simultaneously.

The extraction and washing zone 18 is operated at a pH sufficiently basic to enable at least a portion of the proteins to be dissolved in the extraction solution. Suspended residual solids and a spent extraction solution comprising protein, free phenolic compounds, and phenolic-protein complexes are produced by this step in the process. The spent extraction solution will contain one or more of glucosinolates, phytates and free phenolic compounds depending on the base that is used and the type of oil seed that is used. The pH may be in the range of about 8 to 12.5, preferably about 9 to 12.5 and more preferably 10.5 to 12.

Preferably, the starting meal and the water is added to the reactor that is used in the extraction and washing zone 18. This mixture is stirred, and a base is added to the extraction and washing zone 18 via line 16 to increase the pH to a target value of in the range of about 8 to 12.5. Alternatively, it is understood that the water and base may be premixed and added to the extraction and washing zone 18 via a single line 14. Based upon measurement made upstream or on prior data, the base may be added concurrently with the starting meal and the water to the reactor. In a continuous process, the pH may be monitored such as by a pH probe and base added from time to time to maintain the pH in a target range. Preferably, the pH is maintained at the target value for between about 30 minutes to 120 minutes. The residence time of the feed material in the reactor may be varied to obtain the desired degree of recovery of protein from the starting meal. It will be appreciated that the longer the residence time, the greater the percentage of protein that is extracted.

It is understood that the pH may be maintained by control or manipulation of the ratio of acids and bases used in the system. Any manual or automatic control method known in the art may be used for both continuous or batch contact. The method may be carried out continuously, using standard techniques known in the art, for converting from batch to continuous systems.

The spent extraction solution is then isolated and transported to a filtration station for separation of the suspended residual solids from the spent extraction solution whereby a meal residue is obtained. For example, the suspended residual solids and the spent extraction solution may be withdrawn from the washing and extraction zone 18 through separate lines (not shown) or via a single line 20 to a separation zone 22, wherein the suspended residual solids are separated from the spent extraction solution to obtain the meal residue. If a separate liquid/solid separator 22 is used as shown in FIG. 1, then the separation zone 22 may be any separation module well known in the art, including, but not limited to a filter, a hydrocyclone, a gravity separator, or a centrifuge.

The meal residue may pass via line 24 into an optional residue washing zone 26 where it may be washed with water and neutralized with an acid. The residue is washed to remove further amounts of protein from the wet meal. The meal residue is preferably washed with the extraction solvent, or water, at a solvent to meal ratio ranging from about 0:1 to about 15:1, preferably from about 3:1 to about 9:1 and more preferably from about 4:1 to about 6:1. Acid is optionally added to neutralize the residue for disposal. As shown in FIG. 1, the water and acid are preferably added to the residue washing zone 26 via lines 27 and 29, respectively. Alternatively, it is understood that the water and acid may be pre-mixed and added to the residue washing zone 26 via a single line. In an alternate embodiment, the water may first be added to wash the residue and then acid added to neutralize the residue prior to its disposal. The wash water is removed from the residue washing zone 26 via line 31. Optionally, at least a portion of the wash water is recycled back to the extraction and washing zone 18 via line 33.

Instead of disposing of the residue, the residue may be used to produce a commercial product. For example, the wet meal residue may be passed via line 28 into residue drier 30 where it is dried to produce a protein-containing flour, also referred to as a dried meal residue (MR) that is removed via line 32.

The spent extraction solution is then treated to separate one or more of the glucosinolates, phytates and free phenolic compounds in the spent extraction solution from the spent extraction solution. In accordance with the present invention, one preferred method for separating these impurities is subjecting the spent extraction solution to membrane filtration. Any membrane filtration technology that may separate smaller molecules such as glucosinolates, phytates, and free phenolic compounds from proteins may be employed in this step. Additionally, any separation technology that separates molecules based on molecular weight may be employed in this step.

As shown in FIG. 1, the spent extraction solution is passed into a first membrane processing zone 36 via line 34. The first membrane processing zone 36 serves to remove at least a portion of the low molecular weight impurities, including, but not limited to glucosinolates, phytates, and free phenolic compounds from the solution. It is to be understood that the first membrane processing zone 36 may comprise one or more membrane processing module that is well known in the art for concentrating and purifying a protein, for example an ultrafiltration module, a diafiltration module, a reverse osmosis module, an electrodialysis module, or a dialysis module. Preferably, the first membrane processing zone 36 comprises one or more of an ultrafiltration module, a diafiltration module, a reverse osmosis module, more preferably a diafiltration module, and most preferably an ultrafiltration module for concentrating the protein followed by a diafiltration module to further purify the protein. If diafiltration is utilized, then dilution water may be added to the diafiltration module via line 37.

Ultrafiltration is a pressure driven membrane process that concentrates and purifies large molecules. More specifically, a solution is passed through a semi-permeable membrane whose pore sizes have been chosen to reject the large molecules (proteins) in the retentate, and allow the small molecules (impurities) to pass through the membrane into the permeate. Ultrafiltration reduces the volume of the extraction solution. Diafiltration is an extension of ultrafiltration and involves diluting the retentate with a solution to effect a reduction in the concentration of the impurities in the retentate. In one aspect of the invention, the pH of the dilution water added to the diafiltration module via line 37 may be adjusted to be the same value as the spent extraction solution so that the pH of the extraction solution remains unchanged. The net effect of the diafiltration is to wash out more of the impurities from the retentate. It is understood that the diafiltration may be carried out in a batch mode, semi-continuous mode, or a continuous mode. Preferably, the filtration membranes have a molecular weight cut-off of between about 5-50 kilodaltons, and more preferably between about 5-30 kilodaltons, and most preferably between about 5-10 kilodaltons.

The concentration factor (CF) for ultrafiltration refers to the amount that the product (protein) has been concentrated in the retentate stream. The diavolume (DV) for diafiltration is a measure of the extent of washing that has been performed during the diafiltration step. The CF and the DV are chosen with regard to various factors, including initial protein concentration, initial impurity concentration, initial viscosity of the solution, and purity requirements of the final products. Preferably, the CF in the first membrane processing zone 36 is set between about 3 and 20, more preferably from 3 to 6 and most preferably about 4. Preferably, the DV in the first membrane processing zone 36 is set between about 3 to 15, more preferably from 3 to 5 and most preferably about 4.

The permeate from the first membrane processing zone 36 is removed via line 39. The treated spent extraction solution (retentate or free phenolic reduced solution) is passed via line 38 to a precipitation zone 42 to precipitate at least some of the protein from the retentate. Any process known in the art to precipitate protein from the retentate may be used. For example, the pH of the solution may be lowered by adding an acid, or a precipitating agent may be added to the treated spent extraction solution to reduce the solubility of the protein in the solution.

In a preferred embodiment, the pH of the free phenolic reduced solution is lowered, preferably to the isoelectric point of one of the protein fractions. In one aspect of the invention, an acid is added to the precipitation zone via line 40 to lower the pH of the solution. This causes at least a portion of an isoelectric precipitated protein isolate to precipitate out of the filtered spent extraction solution. Therefore, lowering the pH of the extraction solution produces a precipitated protein isolate (PPI) which exits via line 44 and a treated solution containing a soluble protein isolate (SPI) which exits via line 54.

Any food grade organic or inorganic acid, acidic salts or buffer systems may be used in the precipitation zone 42 to precipitate out at least a portion of the protein as PPI, preferably a substantial portion of the protein (e.g., 50 wt. % or more, based on the weight of the protein in solution) at low protein solubility, representing the isoelectric point of a major fraction of the seed's proteins. Examples of suitable acids include, but are not limited to, hydrochloric acid or acetic acid. *Brassica* oilseeds have diverse and complex protein compositions, and the optimum isoelectric points vary widely from one variety to another. Therefore, the isoelectric points can range from about 2 to about 9 depending on the type of seed that is used. Some examples of isoelectric precipitation points include the following: canola seeds at a pH of about 3.5, Chinese rapeseeds at a pH of about 5, Estonian rapeseed at a pH of about 6.5, and mustard seeds at a pH of between about 5-6. In the precipitation zone 42, the acid is added and the selected pH is preferably maintained for a sufficient period of time, for example between about 15 minutes to about 30 minutes, to allow a substantial portion of the isoelectric proteins to aggregate.

The PPI is preferably passed to a PPI washing zone 46 via line 44 where it may be washed with water and may be neutralized with a base to remove any residual precipitating agent and salts formed during neutralization.

In this embodiment, water is added to the PPI washing zone 46 via line 47, and a base may be added to the washing zone 46 via line 49. Alternatively, it is understood that the water and base may be premixed and added to the PPI washing zone 46 via a single line. The wash water is removed from the PPI washing zone 46 via line 51. Optionally, at least a portion of the wash water which exits the PPI washing zone 46 via line 51 may be passed to the residue washing zone 26 via line 53 to wash the meal residue and increase the quantity of protein in the meal residue.

The washed precipitated protein isolate is optionally passed to a PPI dryer 50 via line 48 where it is dried to produce the final PPI that is removed via line 52.

In an optional series of steps, the SPI may be purified, concentrated and recovered from the treated spent extraction solution, such as by membrane filtration. Thus, as shown in FIG. 1, the treated spent extraction solution may be removed from the precipitation zone 42 and passed to a second membrane processing zone 56 via line 54. Optionally, at least a portion of the wash water that exits from the PPI washing zone 46 via line 51 may be passed via line 55 to the second membrane processing zone 56 to increase the quantity of soluble proteins in the treated spent extraction solution. It is to be understood that the second membrane processing zone 56 may comprise one or more membrane processing module that is well known in the art for concentrating and purifying a protein, for example an ultrafiltration module, a diafiltration module, a reverse osmosis module, an electrodialysis module or a dialysis module. Preferably, the second membrane processing zone 56 comprises one or more of an ultrafiltration module, a diafiltration module, a reverse osmosis module, more preferably a diafiltration module, and most preferably an ultrafiltration module to concentrate the protein followed by an optional diafiltration module to further purify the protein. If diafiltration is utilized, then dilution water may be added to the diafiltration module via line 57. The second membrane processing zone 56 serves primarily to concentrate and further purify the soluble protein fraction.

Preferably, the CF in the second membrane processing zone 56 is set between about 2 to 8, more preferably from 3 to 5 and most preferably about 4. Preferably, the DV in the second membrane processing zone 56 is set between about 1 to 16, more preferably from 2 to 5 and most preferably about 4. The permeate from the second membrane processing zone 56 is removed via line 59. The purified SPI solution (the retentate) is optionally passed to an SPI dryer 60 via line 58 where it is dried to produce the final SPI that is removed via line 62.

Figure 2:
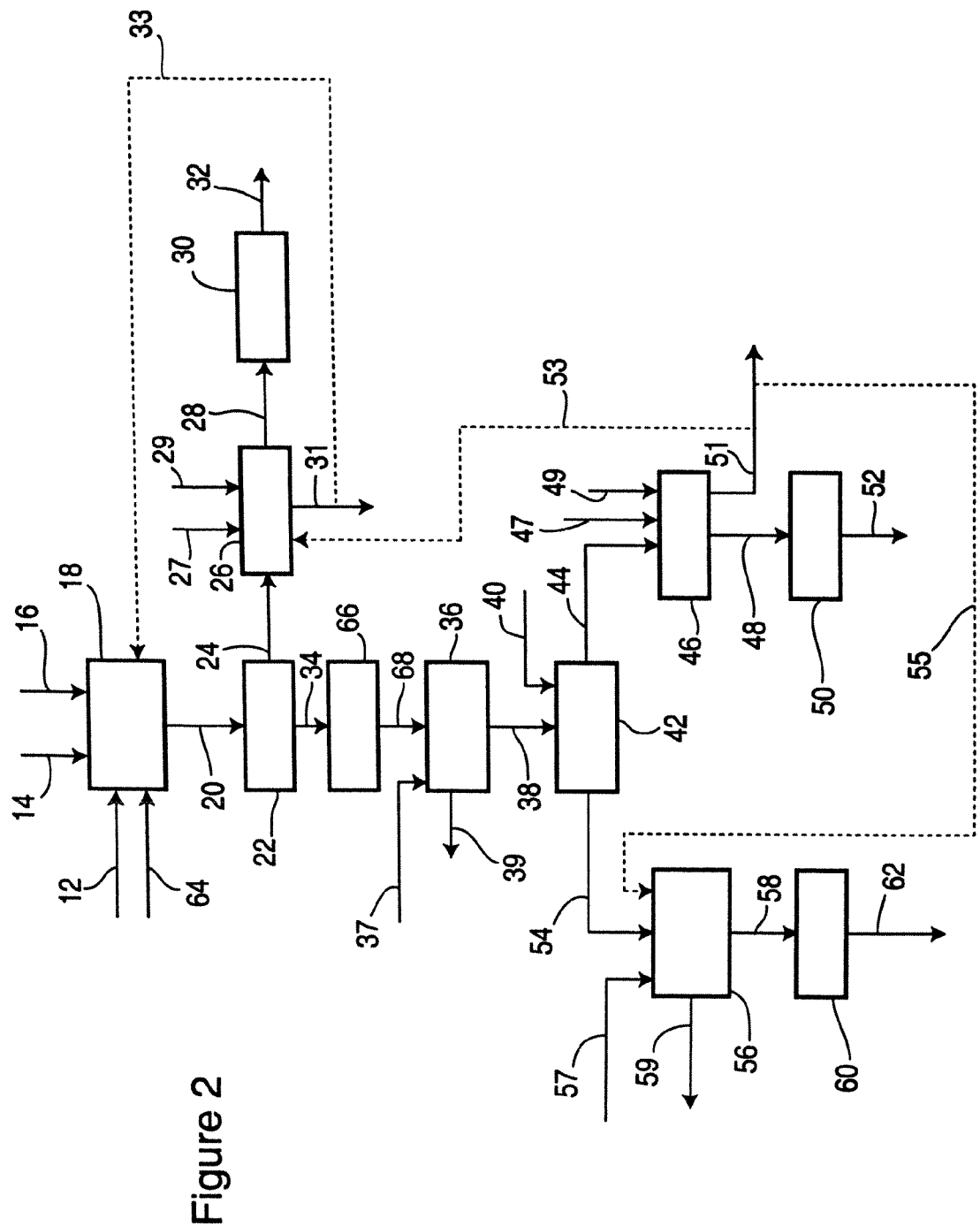
FIG. 2 is a process flow sheet in accordance with a second embodiment of the present invention.

Referring now to FIG. 2, a process flow sheet in accordance with a second embodiment of the present invention is shown. The second embodiment is the same as the first embodiment, except as described below. This embodiment comprises at least one treatment step upstream of the precipitation zone 42 to release at least a portion of the bound phenolics from the phenolic-protein complexes, thus increasing the quantity of the free phenolic compounds in the spent extraction solution.

One such optional treatment step includes heating the spent extraction solution at any point upstream of the precipitation zone 42 and preferably upstream of first membrane processing zone 36. In one aspect of the invention, a heating zone 66 can be provided immediately upstream of the first membrane processing zone 36. In this embodiment, the spent extraction solution is passed into the heating zone 66 via line 34 where it is heated to cause at least a portion of the phenolic-protein complexes to revert to free phenolics and uncomplexed protein. High temperatures can denature the proteins, and thus affect their solubility and functional properties. The spent extraction solution can be heated to a temperature of between about 40° C. and below the temperature of degradation of the protein, which is typically at about 100° C. and more preferably from about 40° C. to about 75° C. The spent extraction solution is preferably maintained at that temperature for a sufficient period of time, for example about 10 minutes to about 180 minutes, to liberate a substantial portion of the complexed phenolics. The actual degree of decomplexing will depend, inter alia, on the temperature of the heating operation and the length of time that the solution is maintained at that temperature.

The heat treated spent extraction solution is then treated as taught for any embodiment of this invention. As shown in FIG. 2, the heat treated spent extraction solution may be passed to the first membrane processing zone 36 via line 68. The solution may need to be cooled prior to membrane processing, to ensure that the maximum operating temperature of the membrane used is not exceeded. It is understood that the heating step may take place in one or more zones, including the extraction and washing zone 18, the separation zone 22, the heating zone 66, and/or the first membrane processing zone 36. Heating the extraction solution helps to dissociate at least a portion of the phenolic or flavour compounds from the phenolic-protein complexes. This increases the quantity of free phenolic compounds present in the heated spent extraction solution. At least a portion of these 'newly freed phenolic compounds' may be subsequently removed from the heated spent extraction solution in the first membrane processing zone 36 if this treatment step occurs upstream of first membrane processing zone 36. This reduces the phenolic compound concentration in the PPI and the SPI.

Another optional treatment step includes the addition of a salt to the extraction solution at any point in the process upstream of the precipitation zone 42 and preferably upstream of first membrane processing zone 36. Pursuant to this embodiment of the invention, a salt can be added to the extraction and washing zone 18 via line 64 (see for example, FIGS. 2-5). However, it is understood that the salt may be added to the extraction solution in one or more zones, including the extraction and washing zone 18, the separation zone 22, the heating zone 66, and/or the first membrane processing zone 36. The salt may comprise any food grade salt that will increase the ionic strength of the extraction solution. In one aspect of the invention, the salt comprises sodium chloride (NaCl). Preferably, the salt is added so that the concentration of the salt in the extraction solution is at a level of between about 0.01M to about 2M, more preferably from about 0.02M to about 0.5M and most preferably at about 0.05M. The salt increases the ionic strength of the extraction solution, thereby breaking apart at least a portion of the ionically bonded phenolic-protein complexes. This increases the quantity of free phenolic compounds present in the spent extraction solution. At least a portion of these 'newly freed phenolic compounds' are subsequently removed from the extraction solution in the first membrane processing zone 36 if this treatment step occurs upstream of first membrane processing zone 36. This reduces the phenolic compound concentration in the meal residue, the PPI and the SPI.

In a further embodiment of this invention, the process may include both the salt addition step and the heating step.

In a further embodiment of this invention, the process may include a heating step and/or a salt addition step in conjunction with a first membrane processing step upstream of the precipitation zone 42.

There are three optional steps described hereinafter that can be added to any of the forgoing embodiments either separately or in any combination thereof. These optional steps serve to further increase the purity of the final products, including the meal residue, the PPI and the SPI.

Figure 3:
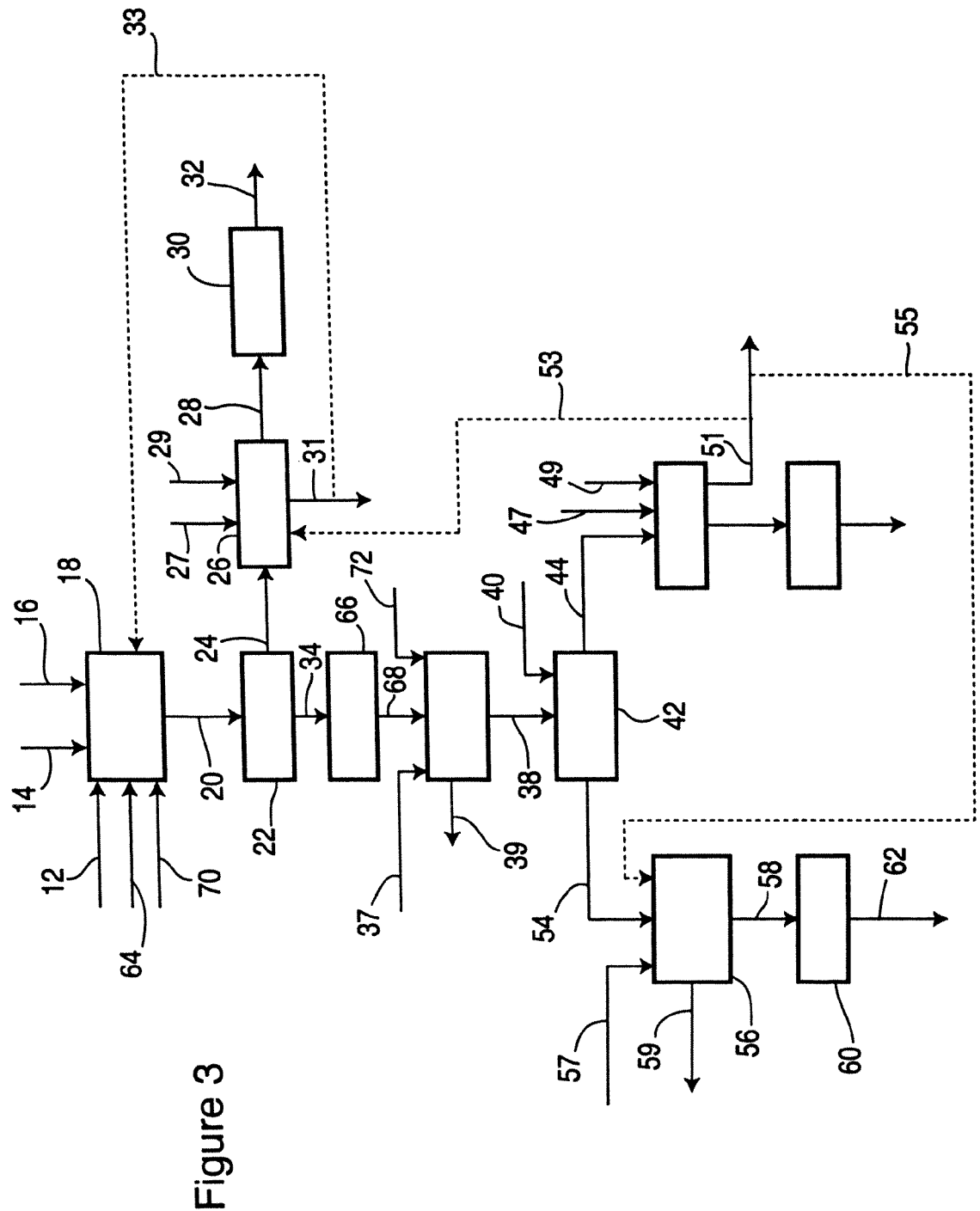
FIG. 3 is a process flow sheet in accordance with a third embodiment of the present invention.

Firstly, the extraction solution may be treated with an anti-oxidant (a reducing agent) at any point in the process upstream of the precipitation zone 42. For example, FIG. 3 shows a process flow sheet in accordance with this embodiment of the present invention. This embodiment is the same as that shown in FIG. 2, except as described hereinafter. In one aspect of the invention, the anti-oxidant is added to the extraction and washing zone 18 and directly to the first membrane processing zone 36 via lines 70 and 72 respectively. However, it is understood that the anti-oxidant may be added to the extraction solution in one or more zones, including the extraction and washing zone 18, the separation zone 22, the heating zone 66 and/or the first membrane processing zone 36. The anti-oxidant may comprise any food grade anti-oxidant. In one aspect of the invention, the anti-oxidant comprises sodium sulfite ($Na_2SO_3$) and/or ascorbic acid at levels consistent with Good Manufacturing Practices, i.e. from about 100 to about 5000 mg/kg, preferably from about 500 to about 1000 mg/kg for ascorbate. Phenolic antioxidants and natural antioxidant extracts may also be used. Oxidation of phenolic compounds under alkaline conditions increases the covalent-binding of phenolics to protein, hence darkening the colour of the protein extracts or solutions. Therefore, the addition of the anti-oxidant at least partially inhibits the formation of covalently bonded phenolic-protein complexes, thus reducing the overall concentration of residual phenolic compounds in the PPI and the SPI.

Figure 4:
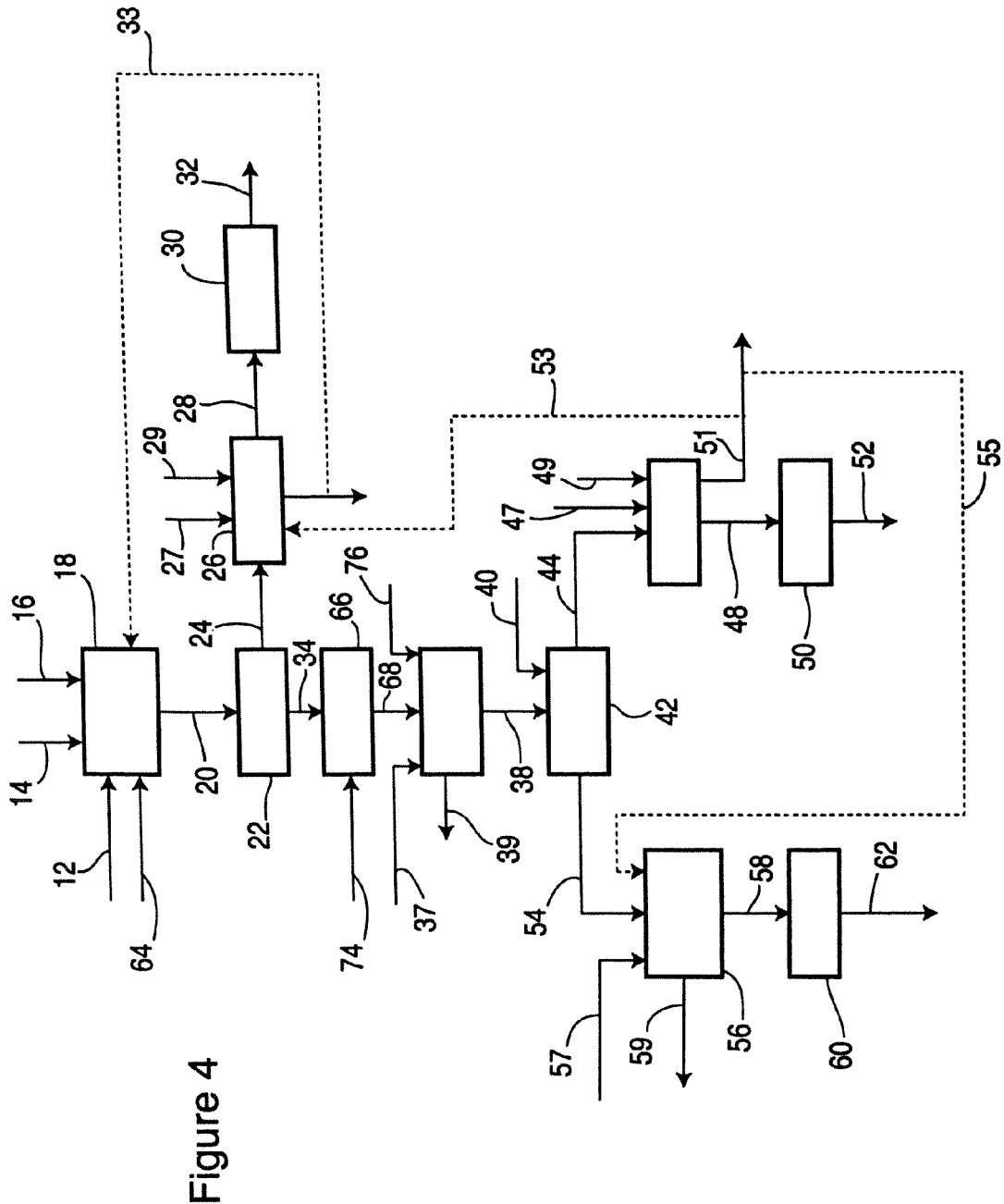
FIG. 4 is a process flow sheet in accordance with a fourth embodiment of the present invention.

Secondly, the extraction solution may be treated with a surfactant at any point in the process upstream of the precipitation zone 42. For example, FIG. 4 shows a process flow sheet in accordance with this embodiment of the present invention. This embodiment is the same as the embodiment shown in FIG. 2, except as described hereinafter. In this aspect of the invention, the surfactant is added to the extraction solution in the heating zone 66 and directly to the first membrane processing zone 36 via lines 74 and 76 respectively. However, it is understood that the surfactant may be added to the extraction solution in one or more zones, including the extraction and washing zone 18, the separation zone 22, the heating zone 66 and/or the first membrane processing zone 36. In one aspect of the invention, the surfactant is sodium lauryl sulphate (SDS). However, any food grade surfactant may be used. Preferably, the SDS is added in a concentration of up to about 0.05% w/w and preferably from about 0.02 to about 0.05%. The surfactant interferes with the hydrophobic interactions that bind together some of the phenolic-protein complexes, thereby releasing at least a portion of the condensed tannins. This increases the quantity of free condensed tannins present in the extraction solution. At least a portion of these 'newly freed condensed tannins' may be subsequently removed from the extraction solution in the first membrane processing zone 36. This reduces the condensed tannins concentration in the PPI and the SPI.

Figure 5:
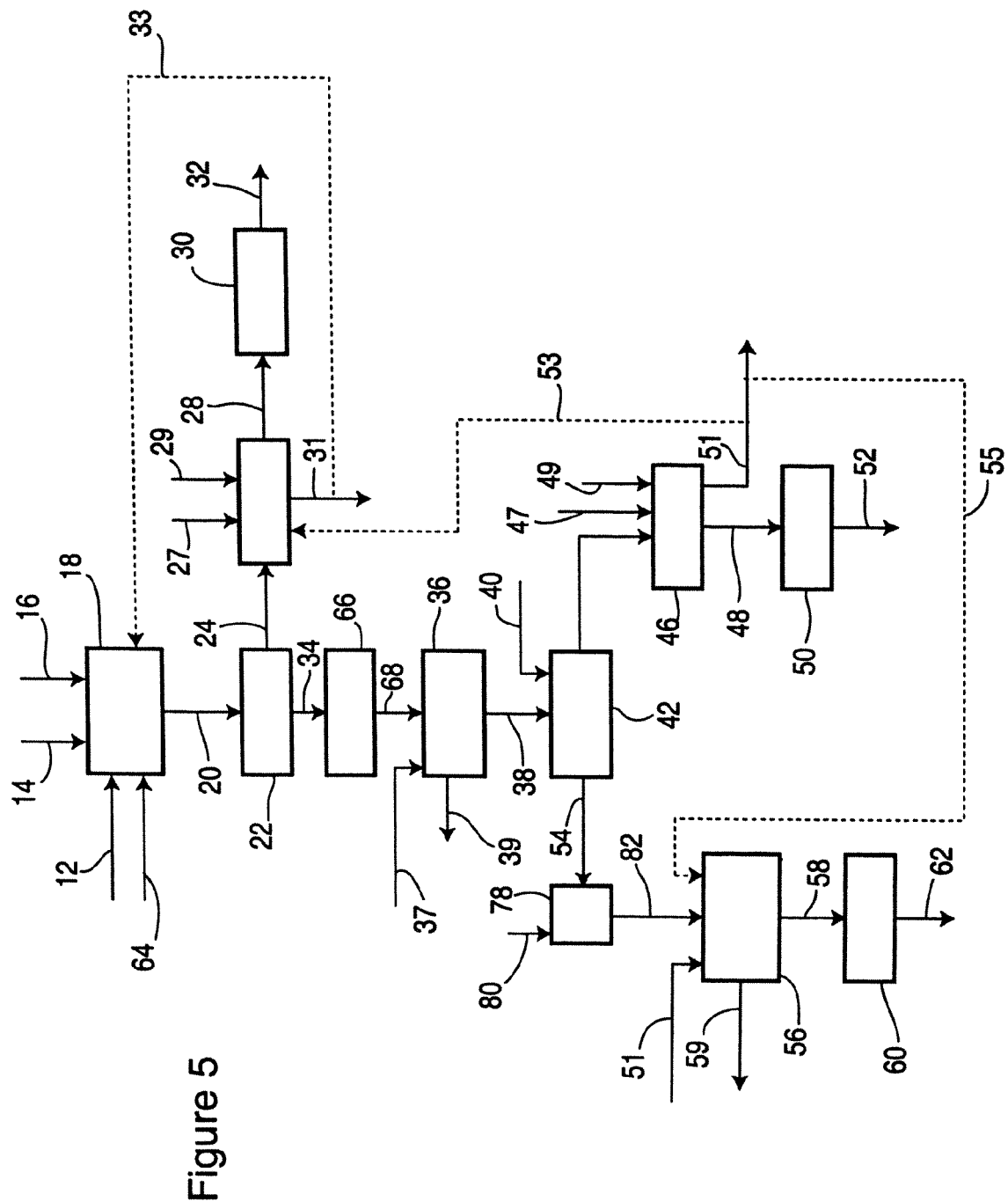
FIG. 5 is a process flow sheet in accordance with a fifth embodiment of the present invention.

Thirdly, the extraction solution comprising the soluble protein fraction may be treated with an insoluble form of polyvinylpyrrolidone (PVP) downstream of the precipitation zone 42. PVP is a specific adsorbent for polyphenols. For example, FIG. 5 shows a process flow sheet in accordance with this embodiment of the present invention. This embodiment is the same as the embodiment of FIG. 2, except as described hereinafter. In one aspect of the invention, a tank 78 can be added immediately downstream of the precipitation zone 42. PVP may be added at any place known in the art. PVP is usually used as the last purification step, to reduce the solid loading on this adsorbant, and thus extend its treatment capacity. In this embodiment, the extraction solution is passed into the tank 78 via line 54, and the PVP is added to the tank 78 via line 80. Preferably, the PVP is added to the extraction solution at levels between about 1% to about 10% of the mass of the starting meal, more preferably from about 1% to about 5%, and most preferably about 1%. Preferably, the PVP is stirred in the extraction solution for a sufficient time period, for example, between about 10 minutes to about 30 minutes, to absorb some, more preferably a substantial portion and most preferably essentially all of the polyphenols. The extraction solution is then passed into the second membrane processing zone 56 via line 82. In one aspect of the invention, the PVP is removed from the extraction solution via line 59. It is understood that the PVP may also or alternately be removed from the extraction solution by filtration and/or centrifugation. PVP may also be used in an immobilized form, for example in a packed bed, which may be regenerated and reused.

The present invention also provides novel *Brassica* protein products, including three novel mustard-based protein products derived from defatted mustard seeds. In one aspect of the invention, the process may be used to produce one or more of the following protein products:

(a) a meal residue comprising about 10-50% w/w (N×6.25) protein and less than about 1% w/w phenolic compounds, preferably less than about 0.5% w/w phenolic compounds, more preferably less than 0.2% w/w phenolic compounds, and most preferably less than 0.1% w/w phenolic compounds;

(b) a bland tasting, light coloured precipitated mustard protein isolate comprising about 80-110% w/w protein (N×6.25) and less than about 1% w/w phenolic compounds, preferably less than about 0.5% w/w phenolic compounds, more preferably less than 0.2% w/w phenolic compounds, and most preferably less than 0.02% w/w phenolic compounds, obtained from isoelectric precipitation;

(c) a bland tasting, lightly coloured soluble mustard protein isolate comprising about 80-110% w/w protein (N×6.25) and less than 1% w/w phenolic compounds, preferably less than about 0.5% w/w phenolic compounds, more preferably less than 0.2% w/w phenolic compounds, and most preferably less than 0.02% w/w phenolic compounds, that is fully soluble at the isoelectric point of the precipitated protein isolate; and, (d) a bland tasting, light coloured precipitated mustard protein concentrate comprising about 30-70% w/w protein (N×6.25) w/w and less than about 1% w/w phenolic compounds, preferably less than about 0.5% w/w phenolic compounds, more preferably less than 0.2% w/w phenolic compounds, and most preferably less than 0.1% w/w phenolic compounds, obtained from combining soluble protein with the meal residue.

In this specification, all references to protein content are expressed on a w/w basis, i.e. (weight of the protein)/(weight of the total product). Moreover, all references to protein content are expressed on an N×6.25 basis.

It is understood that the 'phenolic compounds' present in the protein products refer to either free phenolic compounds and/or protein-phenolic complexes. In a particularly preferred embodiment, the protein products contain essentially no free phenolic compounds. Accordingly, the phenolic compounds present in these preferred protein products are primarily protein-bound phenolic compounds.

The protein products mentioned above do not exhibit the typical 'hot' mustard flavour that is commonly found in products produced from conventional processes. Moreover, these products are free of the allergens typically found in soybeans, and therefore make a good alternative to the more common soybean protein products.

In accordance with the present invention, the method described above liberates at least a portion of the bound phenolic compounds from the protein-phenolic complexes as free phenolics, and subsequently removes at least a portion of the free phenolic compounds in the first membrane processing zone. At least about 10% of the bound phenolics are liberated as free phenolics, preferably at least about 25%, more preferably at least about 50%, even more preferably about at least about 75%, and most preferably at least about 90%. At least about 80% of the free phenolics are removed from the system, preferably at least about 90%, and more preferably at least about 95%. This results in protein isolates, including mustard protein isolates, containing less than about 1% w/w phenolic compounds, preferably less than about 0.5% w/w phenolic compounds, more preferably less than about 0.2% w/w phenolic compounds, and most preferably less than about 0.02% w/w phenolic compounds.

It is understood that the protein products of the present invention can be used as a food or drink additive as is well known in the art; that is, the products may be directly substituted for a similar soy product in food and/or drink products.

The protein products, including the MR, the PPI and the SPI may be incorporated into a variety of different vegetarian meat substitute products including, but not limited to hamburger patties, wieners, cutlets, ground round, and/or deli slices.

The protein products, including the MR, the PPI and the SPI may also be used as a functional ingredient in meat products as they exhibit excellent fat and water binding properties, gelling and emulsion stabilizing properties. Therefore, the products may be used as a meat binder and/or a meat extender in processed meat products including, but not limited to, wieners, frankfurters, ham and hamburgers.

The protein products, including the MR, the PPI and the SPI may also be incorporated into a wide range of added protein containing foods, including, but not limited to, bakery products, nutritional supplements, infant formulations, non-carbonated drinks, and bars, as functional ingredients in place of, or in combination with, other proteins such as gluten, casein and soy proteins.

The SPI is acid soluble and can be used for protein enrichment of carbonated soft drinks. In the past, soybean isolates were typically not used in this context because a clear solution could not be obtained upon the dispersion of the isolate in the drink. Protein may be added at 0.2 to 5% w/v as a source of protein supplementation for therapeutic purposes or protein replacement.

The SPI is acid soluble and can be used for protein enrichment of any type of acidic drinks, including, but not limited to, any type of carbonated or non-carbonated fruit juice (e.g., orange, cranberry, grapefruit, apple, grape, pineapple, and prune), any type of vegetable juice (e.g., carrot, tomato, and mixed juices such as V8™), any type of carbonated soft drink (e.g., colas such as Pepsi™ and citrus flavoured drinks such as Sprite™), any type of carbonated energy drink (e.g., Redbull™), any type of sports drink (e.g., Powerade™ and Gatorade™), and any type of pre-mixed protein drink. Protein may be added at 0.2 to 5% w/v as a source of protein supplementation for therapeutic purposes, nutritional upgrading, or protein replacement. The SPI is substantially dissolved when dispersed into any of the aforementioned drinks (i.e., the solution remains substantially clear and does not form a colloidal dispersion).

The SPI can also be used to provide protein in milk replacements. Milk replacements may include water, fat, some form of sugar or sugar substitute to replace the lactose in milk, calcium and Vitamins A and D. The milk replacement may also include one or more flavor ingredients, including, but not limited to, chocolate, strawberry, and/or vanilla. The milk replacement may also include one or more micronutrients, including, but not limited to, calcium, iron, zinc, selenium, iodine, and Vitamins A and D. The milk replacement may also include one or more nutraceuticals, including, but not limited to, omega-3 fatty acids or their esters, lycopene and sterols. The milk replacement may also be carbonated. The protein may be added to the milk replacement at 0.2 to 5% w/v as a source of protein. In one aspect, the protein may be added at or near the level of the protein found in milk (i.e., about 3% w/v).

The milk replacement can be provided as an 'instant' drink which can be added to water or any other suitable liquid and mixed by the end user prior to consumption. In one aspect, the milk replacement including the protein can be provided in a powdered form. In a further aspect, the milk replacement including the protein can be provided in a concentrated liquid form. This allows the milk replacement to have a relatively long shelf life making it suitable for disaster/famine relief.

The SPI can be also used for protein enrichment of any type of frozen confectionary bars, including, but not limited to, frozen fruit juice bars (e.g., orange, cranberry, grapefruit, apple, grape, and pineapple). The protein may be added to the bar at 0.2 to 5% w/v as a source of protein. In one aspect, the protein may be completely dissolved in the bar at about 3.3% w/v. The bars may also include calcium. The frozen fruit juice bars can be manufactured to provide the same or similar levels of protein and calcium as milk with the added benefit of Vitamin C from the juice.

The SPI can also be used as a functional ingredient in soups. The protein may increase the viscosity, enhance the texture and/or aid in the emulsification of the fat. The protein may be added to the soups at 0.2 to 5% w/v. In one aspect, an 'instant' soup including the protein can be in the form of a powder. In another aspect, the soup including the protein can be in the form of a canned concentrated liquid form. In yet a further aspect, the soup including the protein can be in the form of a fully diluted liquid form, such as, for example, Gardennay™ products manufactured by Campbells.

The MR, PPI and SPI may also be incorporated into industrial applications where proteins are now used, including, but not limited to, sizing in paper, adhesives, and adsorbants.

The MR, PPI and SPI each have different solubilities and water binding capacities. Moreover, the PPI and the SPI have higher protein contents than the MR, and this can be accomplished by using less starting material. Furthermore, the PPI and SPI may also require less flavour masking in some applications. The protein products are similar to the defatted soy flour, soy concentrate, soy isolate and defatted dehulled soy flour range of products.

It will be appreciated that each stage in the process may be operated on a batch basis or on a continuous flow basis.

The following non-limiting examples are illustrative of the present invention:

Example 1

Figure 6:
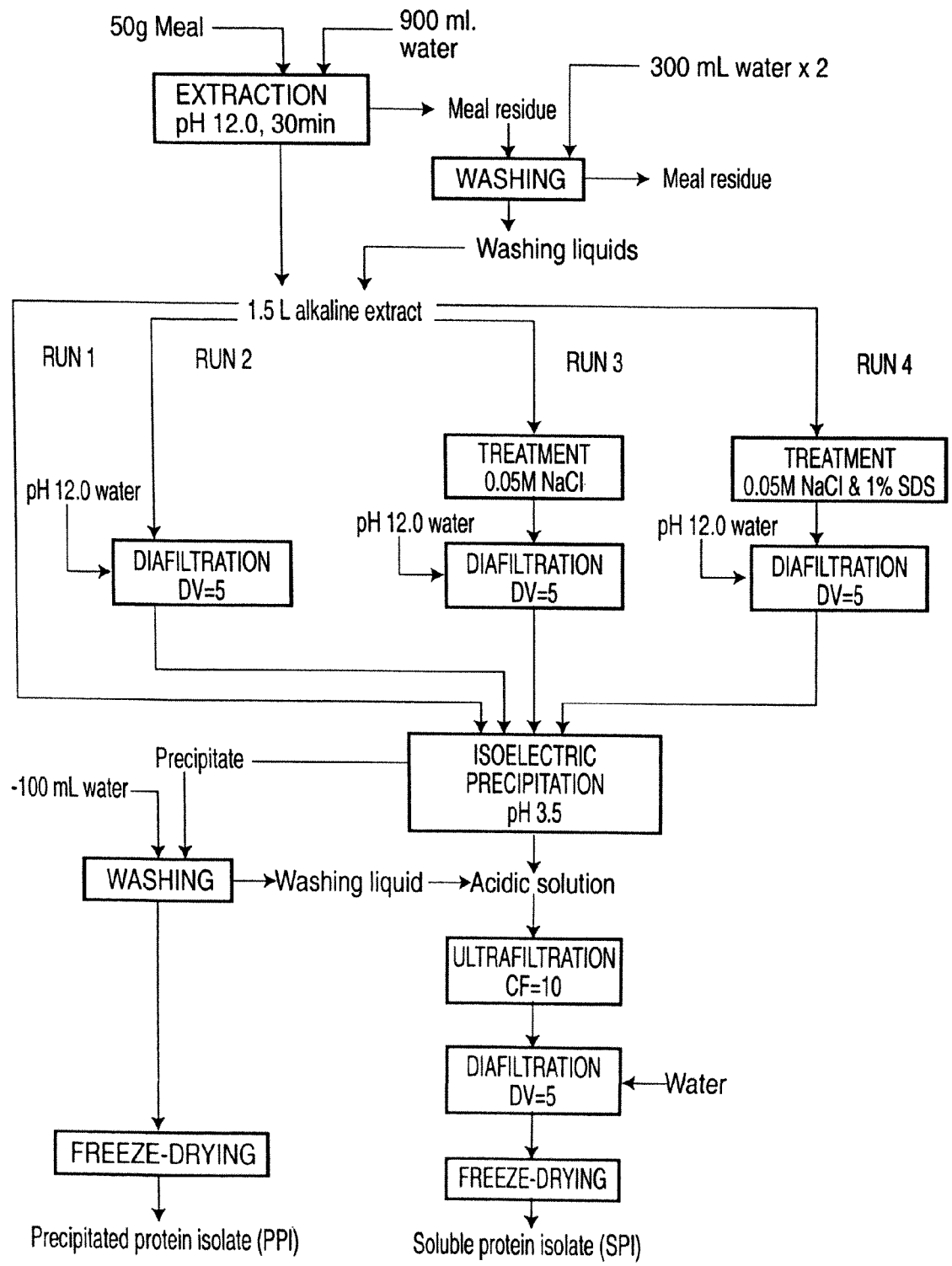
FIG. 6 is a process flow sheet illustrating runs 1-4 of example 1 in accordance with the present invention; and, FIG. 7 is a process flow sheet illustrating runs 5-6 of example 1 in accordance with the present invention.

A series of runs were conducted to illustrate the effects of various treatments on the removal of phenolic compounds from the final protein products. Referring now to FIG. 6, a process flow sheet illustrating runs 1-4 of example 1 in accordance with the present invention is shown.

Run 1 was a control run that did not have a treatment step or a membrane processing step upstream of the isoelectric precipitation step. The protein in 50 g of defatted prepressed canola meal (CanAmera Foods, Hamilton, ON) was extracted by aqueous NaOH at a pH of 12 and a water-meal ratio of 18 for approximately 30 minutes to produce a wet meal residue and an extraction solution. After the extraction, the wet meal residue was separated by centrifugation (6000×g, 15 minutes) with a B-22 centrifuge (International Equipment Company, Needham Heights, Mass.) and the supernatant polished by filtration. The residual solids were washed twice with 6 volume of distilled water. The washing liquids were combined with the original extraction solution. The pH of the extraction solution was reduced to 3.5 with 6 M HCl (the optimum isoelectric point). The precipitated proteins were recovered by centrifugation (4000×g, 15 minutes). The precipitate was washed with approximately 5 times its weight of distilled water (on a wet basis) and centrifuged again for separation. The acidic protein solution from the isoelectric precipitation was combined with the washing liquid and polish-filtered. It was ultrafiltered at a concentration factor of 10 and then diafiltered again at a diavolume of 5 to concentrate and purify the proteins remaining in the extraction solution. Both the washed precipitate and the membrane-processed solution were freeze-dried for 48 hours using a Labconco freeze Dryer-18 (Labconco Corp., Kansas City, Mo.) to obtain two products: precipitated protein isolates (PPI) and soluble protein isolates (SPI).

Run 2 was the same as run 1, except as described below. In this run, a diafiltration step was placed immediately downstream of the extraction step; that is, the diafiltration step was interposed between the extraction step and the isoelectric precipitation step. The extraction solution was diafiltered at a diavolume of 5 and a pH of 12 to purify the proteins in the retentate by removing the low molecular weight impurities from the retentate.

Run 3 was the same as run 2, except as described below. In this run, a treatment step was placed immediately downstream of the extraction step; that is, the treatment step was interposed between the extraction step and the diafiltration step. In this run, NaCl was added to the extraction solution in the treatment step and the diafiltration step to 0.05M NaCl, to increase the ionic strength of the solution and break apart the ionically bonded phenolic-protein complexes. The 'newly freed' phenolic compounds were able to be effectively removed from the extraction solution in the subsequent diafiltration step.

Run 4 was the same as run 3, except as described below. In this run, the treatment step further included the addition of 1 w/w solids SDS to the extraction solution to break apart the phenolic-complexes held together through hydrophobic interactions, thereby releasing condensed tannins. These 'newly freed' condensed tannins were able to be effectively removed from the extraction solution in the subsequent diafiltration step.

Figure 7:
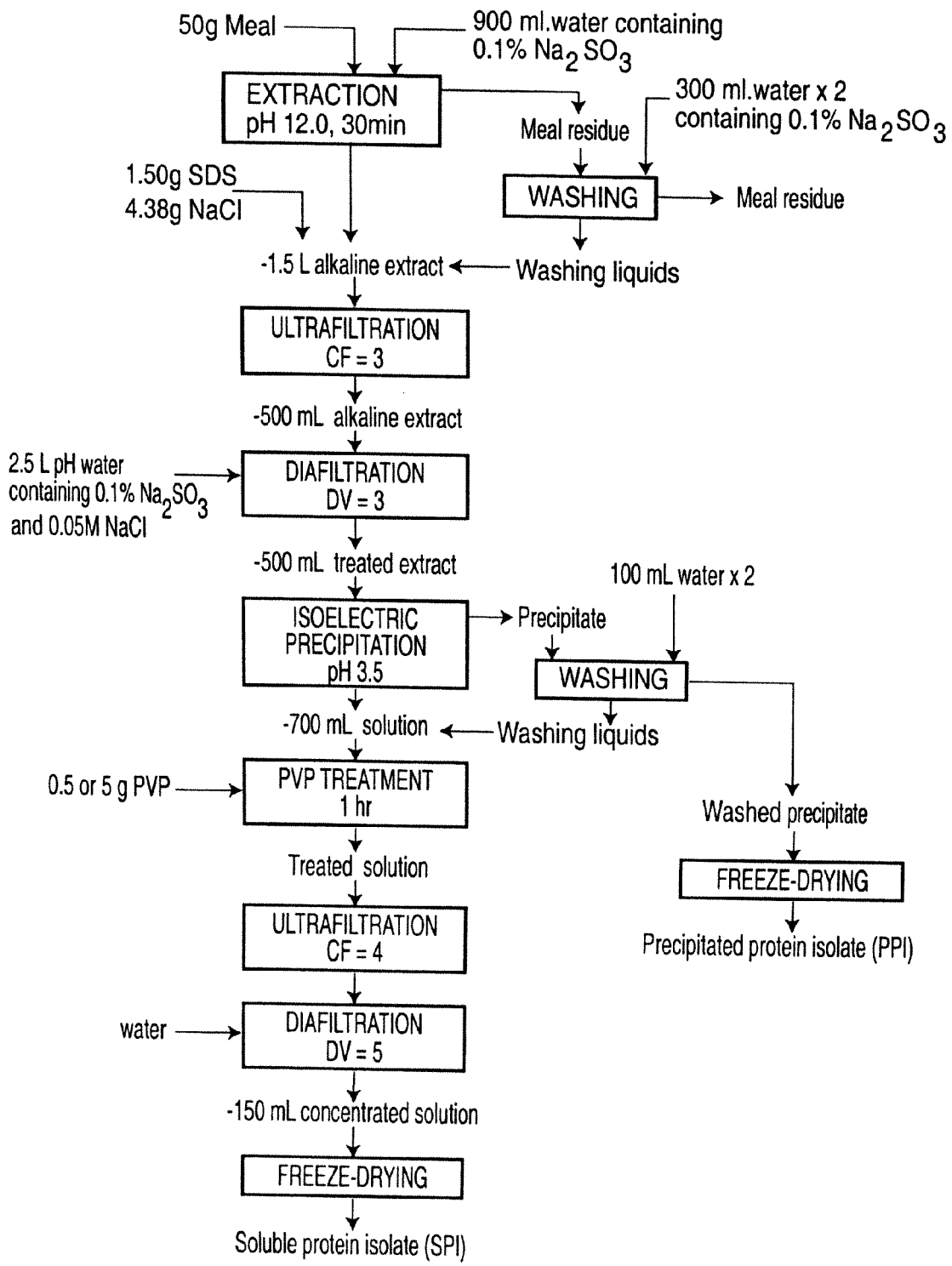

Referring now to FIG. 7, a process flow sheet illustrating runs 5-6 of this example 1 in accordance with the present invention is shown. Run 5 was the same as run 4, except as described below. To reduce the effects of oxidation on the product flavour, sodium sulfite ($Na_2SO_3$) to a concentration of 0.1% w/v solution was added to the extraction solution as a reducing agent. Furthermore, an ultrafiltration step was placed directly downstream of the treatment step; that is, the ultrafiltration step was interposed between the treatment step and the diafiltration step. The ultrafiltration step was included here to reduce the volume processed so that the amount of water for the diafiltration could be greatly reduced, and the processing time shortened. Additionally, a PVP treatment step was placed immediately downstream of the isoelectric precipitation step; that is the PVP treatment step was interposed between the isoelectric precipitation step and the ultrafiltration step. Moreover, a few of the operating parameters were modified.

In Run 5, the protein in 50 g of hexane-defatted prepressed canola meal was extracted with 900 mL aqueous NaOH (to achieve a solvent-to-meal ratio of 18) at pH 12.0 for 30 minutes. To reduce the effects of oxidation on the product flavour and colour, $Na_2SO_3$ at a concentration of 0.1% w/v solution was added to the extraction solution as a reducing agent. After the extraction, the meal residue was separated by centrifugation (6000×g, 15 minutes), and the supernatant polished by filtration using Whatman No. 41 paper. The residual solids were washed twice, each time with 300 mL of distilled water containing 0.1% w/v $Na_2SO_3$. The washing liquids were combined with the original extract to obtain a total volume of about 1.5 L, to which 4.38 g NaCl and 1.50 g SDS were added. The volume of the extract was reduced by a CF of 3 by ultrafiltration. Diafiltration was then conducted at a DV of 3 with water at a pH of 12.0 containing 0.1% w/v $Na_2SO_3$ as an antioxidant and 0.05M NaCl. Immediately after diafiltration, the pH of the extract was adjusted to 3.5 with 6M HCl. The precipitated proteins were recovered by centrifugation (4000×g, 15 minutes). The wet precipitate washed twice, each time with 100 mL water, and then freeze-dried to obtain PPI. The resultant solution combined with the washing liquid has a volume of approximately 700 mL. Five grams of insoluble PVP (~10% w/w solids) was added to treat the solution for an hour, and then separated by filtration using No. 42 Whatman paper. The treated solution was ultrafiltered at a CF of 4 and then diafiltered at a DV of 5. The concentrated and further purified proteins in the solution were also freeze-dried to produce SPI.

Run 6 was the same as run 5, except as described below. In this run, only 0.5 grams of PVP (~1% w/w solids) was added to the PVP treatment zone.

TABLE 1

Mass and protein recoveries of the products from runs 1-4

| Treatments | Products | Mass (%)[a] | Protein (%)[b] |
|---|---|---|---|
| Run 1 (Control) | PPI[c] | 15.2 | 33.6 |
|  | SPI[d] | 10.0 | 23.9 |
|  | Total | 25.2 | 57.5 |
| Run 2 (Diafiltration) | PPI | 14.9 | 34.3 |
|  | SPI | 9.4 | 22.6 |
|  | Total | 24.3 | 56.9 |
| Run 3 (0.05M NaCl) | PPI | 15.1 | 35.0 |
|  | SPI | 8.1 | 20.0 |
|  | Total | 23.2 | 55.0 |
| Run 4 (0.05M NaCl with 0.1% SDS[e]) | PPI | 15.5 | 35.4 |
|  | SPI | 8.0 | 19.4 |
|  | Total | 23.5 | 54.8 |

[a]Percentages of mass recoveries were calculated based on 50 g starting meal.
[b]Percentages of protein recoveries were calculated based on the total amount of protein in 50 g starting meal, determined to be 19.05 g
[c]Precipitated protein isolate
[d]Soluble protein isolate.

Mass recoveries for all runs were about 15% for PPI and 9% for SPI. While the combined mass recovery of PPI and SPI was only about 24%, more than half of the nitrogen in the meal was recovered in the two protein isolates. The recovery ratio of PPI to SPI was about 1.5, indicating that most of the extracted canola proteins could be precipitated at a pH of 3.5. Although neither mass nor protein recoveries varied much, all the runs with the treatments for the removal of phenolics (Runs 2, 3, and 4) gave slightly lower total mass recoveries than the control run (Run 1). Some 10% nitrogen was lost to the permeate in the membrane processing in the form of non-protein nitrogenous compounds of low molecular weights, including short peptides and free amino acids.

glycoproteins in rapeseed/canola has been previously reported (Jones, 1979). The treatments removed some low-molecular-weight impurities, including phenolics, before iso-electric precipitation, thus increasing the protein content of the products over the control run (Run 1). In all cases, the SPIs were higher in protein than the PPIs.

The phenolic acid and condensed tannin contents showed a distinct descending trend with increased number of treatments, confirming that each treatment indeed removed some phenolic compounds. From the control run (Run 1) where no treatment was employed, both protein isolates were high in

TABLE 2

Effects of treatments to remove phenolic compounds by comparison of the compositions of the final products

| Treatments | Protein[a] (%) | | Phenolic acids[a] (mg/100 g sample) | | Condensed tannins[a] (mg/100 g sample) | |
|---|---|---|---|---|---|---|
| | PPI | SPI | PPI | SPI | PPI | SPI |
| Run 1 (Control) | 84.7 | 91.1 | 1094 | 1053 | 675 | 852 |
| Run 2 (Diafiltration) | 87.7 | 92.6 | 917 | 823 | 457 | 648 |
| Run 3 (0.05M NaCl) | 88.5 | 94.9 | 451 | 470 | 347 | 562 |
| Run 4 (0.05M NaCl with 0.1% SDS) | 87.2 | 92.3 | 301 | 345 | 62 | 34 |
| ACV[b] (%) | 0.27 | 0.35 | 7.1 | 5.3 | 8.0 | 5.8 |

[a]All results are reported as is; results of protein content are means of triplicates, and others are means of duplicates
[b]Average coefficient of variation

TABLE 3

Compositions and yields of the products from Run 5[a]

| Product | Compositions[b] | | | Yields (as % of starting meal) | |
|---|---|---|---|---|---|
| | Protein (%) | Phenolic acids (mg/100 g sample) | Condensed tannins (mg/100 g sample) | Mass | Protein |
| Starting meal | 38.1 | 1596 | 677 | 100 | 100 |
| Precipitated protein isolate (PPI) | 87.0 | 274 | N/D[c] | 15.3 | 35.0 |
| Soluble protein isolate (SPI) | 91.6 | 114 | N/D | 8.5 | 20.4 |
| Meal residue (MR) | 22.1 | 360 | N/D | 58.3 | 33.8 |
| "Unrecovered"[d] | — | — | — | 17.9 | 10.8 |

[a]Modified with 0.05M NaCl and 0.1% SDS of treatment of alkaline extract, and ultrafiltration followed by diafiltration before isoelectric precipitation, and treatment of acidic solution with 10% PVP after isoelectric precipitation.
[b]All results are reported as is; results of protein content are means of triplicates, and others are means of duplicates
[c]Not determined
[d]"Unrecovered" was calculated by subtraction: starting meal (100) − all products Chemical Analysis Crude protein (N×6.25) was determined by Kjeldahl method, American Association of Cereal Chemists (AACC, 1976, Method 46-12), using a Buchi 425 digester and a Buchi 315 distillation unit (Brinkman Instruments Inc., Mississauga, ON). The analytical method of Xu and Diosady (1997) was used for determination of total phenolic acid content with results expressed as sinapic acid equivalents. Condensed tannin content was determined by the method of Shahidi and Naczk (1989) as catechin equivalents. The residual SDS was determined using a method based on dissociation precipitation and gravimetric determination of the sulphate, (Igor et al., 1993). The precipitated sulphate was then quantitated using AACC Method 40-66 (1976).

All products contained 85-95% w/w protein. The remaining 5-15% were likely polysaccharides. The existence of phenolic compounds. Their phenolic acid contents were over 1000 mg per 100 g sample, approximately 65% of the value of the starting meal (1596 mg/100 g) and the condensed tannin contents even exceeded that of the starting meal (676 mg/100 g). Since no treatment was used in the control run, only those phenolic compounds not bound to the canola protein in the pH 3.5 solution were eventually removed by the membrane-processing (ultrafiltration followed by diafiltration). Although the free phenolic compounds made up more than half of the total amount of the solution, the remaining phenolic compounds that were bound to the proteins could still give rise to high phenolic contents in the final products. As a result of the high phenolic contents, the protein products still exhibited undesired organoleptic properties such as dark colour and a bitter taste.

Run 2 employed a diafiltration step immediately upstream of the isoelectric precipitation step to remove the free fractions of both phenolic acids and condensed tannins from the alkaline extraction solution. It is shown in Table 2 that, with this treatment, the phenolic acid contents in PPI and SPI were decreased by 17 and 22% respectively, while condensed tannins were reduced by 32 and 24% respectively.

In Run 3, 0.05M of NaCl was added to the extraction solution in the treatment step and the diafiltration step to increase the ionic strength of the solution and break apart the ionically bonded phenolic-protein complexes. The 'newly freed' phenolic compounds were able to be effectively removed from the extraction solution in the subsequent diafiltration step. The removal of the ionically bound phenolic-protein complexes reduced the phenolic acid content of the protein isolates to half of the level obtained in Run 2. In comparison, the removal of the ionically bound protein complexes resulted in a decrease in condensed tannins in PPI and SPI of 24 and 13% respectively.

In Run 4, treatment with 0.1% w/v SDS greatly reduced the amount of condensed tannins in both protein products. With the addition of SDS, condensed tannin contents in both protein products were slashed by more than 90% compared with Run 3. In fact, condensed tannin levels in the products were so close to the detection limit of the analytical method (~10 mg/100 g sample) that it was likely that these products were essentially tannin-free.

Binding of SDS to canola proteins was demonstrated previously (Igor et al. 1993). Residual SDS would render the protein products practically useless due to the sensory and health effects. However, in this example, SDS levels in the products from Run 4 were well below 0.5 w/w % thus acceptable on the basis of health safety alone (Health Canada, 1994). To explain this, it was postulated that at a high pH such as 12, the binding of SDS to canola proteins became much weaker than in the acidic range since both were negatively charged at high pH, and the electrostatic repulsion was able to keep them apart to a certain extent, thus allowing the removal of SDS by diafiltration, resulting in low residual SDS content in the final products.

The results for Run 5 are presented in Table 3. The mass and protein distribution were not greatly affected by the process modifications. While more than half of the meal protein was recovered in the protein isolates, about 60% meal solids (mass) ended up in the meal residue. The PVP treatment reduced the phenolic acid content in the acidic SPI by more than 50% as compared to Run 4, while the protein content in the SPI was not affected by the addition of the PVP. The condensed tannin contents of these protein isolates were not determined as they were known to be essentially tannin-free in Run 4.

Run 6 was the same as Run 5, except that only 1% w/w solids PVP was added in the PVP treatment zone. The phenolic acid content of SPI obtained was similar to the results obtained from Run 5 (10% w/w solids PVP), suggesting that 1% was adequate.

Colour Measurement

The colour of all PPIs was measured using a D25A-9 Hunter Colorimeter. The instrument consisted of two sections—the optical sensor and the signal processor. The optical sensor used light from a quartz halogen lamp, which was filtered to closely approximate CIE illuminant D65. The light was directed upward to the sample port at an angle of 45° from the perpendicular. The light receptor was placed directly below the sample port. The signal processor converted the photometric signals to the standard Hunter L, a, b scale. For each measurement approximately 4 g of sample were used.

The colour of SPI samples was evaluated in aqueous solution using a Beckman DU-7 UV-visible spectrophotometer (Beckman Instruments Inc., Irvine, Calif.). The sample was first dissolved in distilled water at a concentration of 1% (w/v), and centrifuged (6000×g, 15 minutes) with a Centra 4 centrifuge (International Equipment Company, Needham Heights, Mass.). The supernatant was decanted into a quartz cuvette and scanned in the range of 385 to 700 nm against distilled water as blank.

TABLE 4

| PPI Samples | L (Lightness) | a (Redness) | b (Yellowness) |
|---|---|---|---|
| Run 1 Control | 52.1 | 3.1 | 21.4 |
| Run 2 | 61.5 | 3.4 | 14.2 |
| Run 3 | 60.2 | 3.8 | 14.3 |
| Run 4 | 66.9 | 2.7 | 12.9 |
| Run 6 | 69.3 | 0.8 | 17.5 |

The colours of PPIs from different runs were measured and compared using a Hunter colorimeter. For each measurement a 4 g sample was needed, which was actually more than half of the amount of each sample produced in a single run. A Hunter calorimeter measures the colour in the three-dimensional colour system. All L values in Table 4 were measures of sample lightness, with 100 being white and 0 being black. All a values indicated redness varying between +100 and −80 as sample colour changed from red to green, whereas yellowness was read by b values from +100 (yellow) to −80 (blue). It was confirmed that samples became lighter with more intensive treatments to remove phenolic compounds except for the treatment with 0.05 M NaCl, which did not influence the colour lightness. The PPI sample from Run 1 (Control Run) had a much higher phenolic content than that from Run 5, hence a more intense yellow colour.

All SPIs were fluffy, and displayed a similar desirable off-white colour. However, upon dissolution in water, their solutions showed brown colours of different intensities. Therefore, colour measurements of the SPIs were performed by scanning their aqueous solutions in the UV-visible range. The colour of these solutions may also be due to the presence of phenolic compounds as the products with lowered phenolic contents were lighter in colour. However, no treatment could completely eliminate the colour.

The colour measurements confirm that the dark colour of canola protein isolates is dependent on their phenolic content. Treatments that remove phenolic compounds lead to lighter coloured protein isolates.

Sensory Evaluation

A simple preliminary comparison of the samples' taste was performed using a descriptive sensory test method, unstructured scaling, also known as line or visual analogue scaling (Poste, Mackie, Butler & Larmond, 1991). A panel was set up consisting of 13-14 people. The samples were presented in jars wrapped with aluminum foil to mask colour differences, thus avoiding stimulus error. The order of presentation of the samples was randomized to minimize central tendency error. Drinking water was offered for mouth rinsing between samples to control contrast effect. To minimize expectation error, all panelists were given only enough information to conduct the test, and the person directly involved in making the products was not included in the panel.

The most commonly used unstructured scale consists of a horizontal line 15 cm long with two anchor points on both ends and a mid point. Each anchor point is labeled with a word or expression. A separate line is used for each sensory attribute to be evaluated. In this study a technical and hedonic attribute were investigated: taste intensity and pleasantness of products. Panelists recorded their evaluation by making a vertical line across the horizontal line at the point that best reflects their perception of the magnitude of that property. Numerical scores were then given to the ratings by measuring the distance of the marks from the left end of the line in units of 0.1 cm. One score was an equivalent of 1 cm on a graphical scale.

TABLE 5

Results of sensory test for canola protein isolates

| Products | Taste Features | Run 1 | Run 2 | Run 3 | Run 4 | Run 5 | Run 6 | Soy Protein (Supro 500) |
|---|---|---|---|---|---|---|---|---|
| PPI | Taste Intensity | 11.5e | 12.1e | 8.2f | 7.3f | 4.9g | NA | 4.4g |
| PPI | Pleasantness | 4.9ef | 4.1e | 6.0efg | 7.7efg | 7.9fg | NA | 9.1g |
| SPI | Taste Intensity | 9.9ef | 10.9e | 7.9fg | 6.8g | 6.3g | 6.4g | NA |
| SPI | Pleasantness | 4.8ef | 3.6e | 6.5fg | 7.3fg | 7.9g | 7.8g | NA |

* samples with the same subscript are not significantly different from each other Since canola protein isolates prepared as above are intended to be eventually used as functional ingredients in food, it is desirable that they do not contribute to flavour, or provide only minimal, complementary flavour to food products. Therefore, their taste was evaluated using sensory test methods to determine both taste intensity and acceptability (pleasantness). As PPI and SPI have distinctly different functional properties, and will likely be used in different food systems, they were evaluated and compared separately. The unstructured scaling method was chosen in this study because it is useful for providing information on the degree or intensity of the sensory characteristics of concern, thus helping to identify treatments or processing variables responsible for these characteristics.

In order to determine the difference in taste among the PPI or SPI samples made by the above processing runs, the sensory test data were analyzed using ANOVA (analysis of variance) method. Based on the results of ANOVA it could be concluded that, while the effect of human bias was insignificant, there were statistically significant differences in taste intensity and pleasantness among these canola protein isolates from different runs ($P \leq 0.05$). To further determine whether these products were different from one another, Tukeys multiple comparison test was performed (Snedecor and Cochran 1989). The results are presented in Table 5, using letters to indicate differences. For taste intensity, the higher numerical values connoted a stronger taste. Pleasantness was a hedonic measurement, the values of which represented the degree of acceptability or preference of taste. Any two values not sharing a common letter are significantly different at $P \leq 0.05$. An ideal product from this work will have minimal or zero taste intensity. The scale for pleasantness ranges from 0 to 15, and on this scale the completely bland product would have an ideal score of 7.5.

It was shown that, while both the PPI and SPI from Run 1 (control run) had a distinct flavour, the low taste intensity of the PPI from Runs 5 and 6 were comparable to that of a commercial soy protein isolate. The difference in their pleasantness was, however, far less significant than their taste intensity, as the panelists did not find the blander products much more pleasant to taste than the products from Run 1 (control run). They also seemed to like the PPI from Run 5 as much as the commercial soy protein isolate, as suggested by the data. As for the SPI from Run 5, not only did the panelists find it much blander than that from the control run, they also had an obvious preference for it to its counterpart from Run 1 (control run). The phenolic adsorption by PVP only slightly improved the taste of the SPI both for Runs 5 and 6.

The results of the sensory evaluation show that phenolic compounds are the major contributors to the undesirable flavours such as bitterness or astringency of canola protein isolates, and the taste of these products was improved as phenolic compounds were removed by the treatments.

Example 2

The protein in 50 g hexane-defatted prepressed canola meal was extracted with 900 mL aqueous NaOH (to achieve a solvent-to-meal ratio of 18) at pH 12.0 for 30 minute. The pH was maintained at 12.0 by adding 50% (w/w) NaOH. To reduce the effects of oxidation on the product flavour and colour, $Na_2SO_3$ was added to the extraction solution as a reducing agent to a concentration of 0.1% w/v After the extraction, the meal residue was separated by centrifugation (6000×g, 15 minutes), and the supernatant polished by filtration using Whatman No. 41 paper. The residual solids were washed twice, each time with 300 mL of distilled water. The washing liquids were combined with the original extract to obtain a total volume of about 1.5 L, to which 4.38 g NaCl and 1.50 g SDS were added resulting in concentrations of 0.3% w/v (0.05 M) and 0.1% w/v respectively. The volume of the extract was reduced by a CF of 3 by ultrafiltration. Diafiltration was then conducted at a DV of 5 with water at pH 12.0, containing 0.1% w/v $Na_2SO_3$ as an antioxidant. Immediately after diafiltration, the pH of the extract was adjusted to 3.5 with 6M HCl, and maintained at the value for 15 minutes before centrifugation to separate the precipitate from the solution (6000×g, 15 minutes). The wet precipitate washed with 100 mL water, and then freeze-dried to obtain PPI. The resultant solution combined with the washing liquid has a volume of approximately 700 mL. Five grams of insoluble PVP was added to treat the solution for an hour, and then separated by filtration using No. 42 Whatman paper. The treated solution was ultrafiltered at a CF of 4 and then diafiltered at a DV of 5. The concentrated and further purified proteins in the solution were also freeze-dried to produce SPI.

The products were analyzed for protein, glucosinolates, phenolic acids, and condensed tannins.

The compositions and yields of the products are shown in Table 6. Both PPI and SPI had a protein content in excess of 85%. Both protein isolates were essentially free of condensed tannins and glucosinolates, and very low in phenolic acids. The protein isolates produced by this process were much lighter in colour and blander in taste than those prepared without the pretreatment.

While the combined mass recovery of PPI and SPI was only about 24%, more than half of the nitrogen in the meal was recovered in the two protein isolates. The recovery ratio of PPI to SPI was about 1.5, indicating that most of the extracted canola proteins could be precipitated at pH 3.5. Some 10% nitrogen was lost to the permeate in the form of non-protein nitrogenous compounds of low molecular weights, including short peptides and free amino acids.

The predominant glucosinolate in yellow mustard seed is p-hydroxybenzyl glucosinolate, which is also a principal phenolic component of the seed. The procedure of Example 2 was repeated, with the following changes: each run started with 30 g meal, all the amount of all reagents were reduced proportionally, and no SDS was added to the alkaline extraction solution. After membrane processing, the pH of the alkaline solution was lowered to 4.75 to precipitate the isoelectric proteins, and the acidic protein solution was not treated with insoluble PVP.

As shown in Table 7, the PPI had a protein content close to 90% while that of SPI was as high as 98%. The treatments employed in the process were effective in removing glucosinolates as well as phytates to below the detection limits of the

TABLE 6

Compositions and yields of products from hexane-defatted prepressed canola meal

| | Compositions[a] | | | Yields (as % of starting meal) | |
|---|---|---|---|---|---|
| Product | Protein (%) | Phenolic acids (mg/100 g sample) | Condensed tannins (mg/100 g sample) | Mass | Protein |
| Starting meal | 40.4 | 1691 | 707 | 100 | 100 |
| Precipitated protein isolate (PPI) | 89.2 | 281 | N/D[b] | 15.3 | 35.0 |
| Soluble protein isolate (SPI) | 94.2 | 117 | N/D | 8.5 | 20.4 |
| Meal residue (MR) | 22.8 | 372 | N/D | 58.3 | 33.8 |
| "Unrecovered"[c] | N/A[d] | N/A | N/A | 17.9 | 10.8 |

[a]All Results are reported on moisture-free basis.
[b]Not detected.
[c]"Unrecovered" was calculated by subtraction: starting meal (100) – all products
[d]Not applicable.

Example 3

Hexane-defatted yellow mustard meal with a glucosinolate content of over 200 µmol/g was used as the starting material.

standard methods of analysis. The overall mass yield of yellow mustard protein isolates was 31% w/w starting meal, containing 67% of the protein in the starting meal. Some 14% of the nitrogen was lost to the permeate.

TABLE 7

Compositions and yields of products from hexane-defatted yellow mustard meal

| | Compositions[a] | | | Yields (as % of starting meal) | |
|---|---|---|---|---|---|
| Product | Protein (%) | Glucosinolate (µmol/g) | Phytate (%) | Mass | Protein |
| Starting meal | 43.2 | 202 | 2.16 | 100 | 100 |
| Precipitated protein isolate (PPI) | 89.1 | N/D[b] | N/D | 18.0 | 37.1 |
| Soluble protein isolate (SPI) | 98.0 | 2.95 | N/D | 13.0 | 29.5 |
| Meal residue (MR) | 19.1 | 6.99 | 4.37 | 44.0 | 19.4 |
| "Unrecovered"[c] | N/A[d] | N/A | N/A | 25.0 | 14.0 |

[a]All Results are reported on moisture-free basis.
[b]Not detected.
[c]"Unrecovered" was calculated by subtraction: starting meal (100) – all products
[d]Not applicable.

Example 4

Hexane-defatted, dehulled yellow mustard flour was processed as described in Example 3, with the following modifications: during protein extraction, ascorbic acid was added as an antioxidant instead of $Na_2SO_3$. Before membrane processing, the alkaline extraction solution was heated to 50~60° C., and maintained at that temperature for about 30 minutes. This step was shown to improve the flavour of cooked meat products containing mustard PPI. Diafiltration was conducted with 0.3% (0.05M) NaCl, adjusted to pH 12 by NaOH. The protein solution after precipitation at pH 4.75 was not further processed. Therefore, PPI was the only protein isolate produced in this case.

Due to dehulling, the starting material had a higher protein content than mustard meal used in Example 3. The results given in Table 8 show that even though soluble proteins were not recovered, the protein recovery of PPI alone was as good as that of both protein isolates combined in Example 3.

TABLE 8

Protein contents and yields of products from dehulled, hexane-defatted yellow mustard flour

| | Protein content[a] | Yields (as % of starting meal) | |
|---|---|---|---|
| Product | (%) | Mass | Protein |
| Starting meal | 54.2 | 100 | 100 |
| Precipitated protein isolate (PPI) | 96.0 | 38.0 | 67.4 |
| Meal residue (MR) | 23.5 | 24.2 | 10.5 |
| "Unrecovered"[b] | N/A[c] | 37.8 | 22.1 |

[a]All results are reported on moisture-free basis.
[b]"Unrecovered" was calculated by subtraction: starting meal (100) – all products
[c]Not applicable.

Example 5

Hexane-defatted, dehulled yellow mustard flour was processed as described in Example 3, with the following modifications: 0.05% w/v hydrogen peroxide was added to the precipitated protein isolate slurry prior to drying. The hydrogen peroxide addition lightened the colour of the isolate from a light tan to an off-white colour. The protein content and yield remained the same as in example 4. This bleaching step may be optionally added to the process of any embodiment of the instant invention.

Example 6

The process described in Example 4 was scaled up to 50 kg of defatted and dehulled yellow mustard flour as starting material.

To 200 gal (750 L) water 50 kg defatted dehulled mustard flour, 2.2 kg NaCl and 0.5 kg ascorbic acid were added. The protein extraction was carried out at pH 11.0. The wet solids after centrifugation were washed with 100 gal water containing 1.1 kg NaCl at pH 11.

The solids were neutralized by adding 6M HCl and then spray-dried to produce MR.

The liquids were combined and heated to ~50° C. The volume was reduced to a third by ultrafiltration, then the liquid was diafiltered to a diavolume of 4 with 0.05M NaCl adjusted to pH 11. The pH of the retentate was lowered to 5.0 to precipitate the proteins. The precipitate was separated by centrifugation and spray-dried to produce PPI.

The supernatant containing soluble proteins was ultrafiltered, (CF=4) diafiltered (DV=4), and then spray-dried to obtain SPI.

The production of PPI, SPI and MR from the scaled-up process was 13.4, 2.5 and 12.2 kg, respectively. The mass and protein recoveries of PPI are shown in Table 9. Although SPI accounted for only 9% w/w of the starting protein, its protein content was in excess of 99%. The flour (MR) contained about 30% w/w protein. Each of these products was successfully incorporated into a processed meat formulation, producing products with good functional and organoleptic properties as described in Example 7.

TABLE 9

Protein contents and yields of products from 50 kg dehulled, hexane-defatted yellow mustard flour

| | Protein content[a] | Yields (as % of starting meal) | |
|---|---|---|---|
| Product | (%) | Mass | Protein |
| Starting meal | 54.6 | 100 | 100 |
| Precipitated protein isolate (PPI) | 88.1 | 26.8 | 43.2 |
| Soluble protein isolate (SPI) | 99.2 | 5.0 | 9.0 |
| Meal residue (MR) | 29.3 | 24.4 | 13.0 |
| "Unrecovered"[b] | N/A[c] | 43.8 | 34.8 |

[a]All results are reported on moisture-free basis.
[b]"Unrecovered" was calculated by subtraction: starting meal (100) – all products
[c]Not applicable.

Example 7

A simple preliminary sensory evaluation was carried out to determine the acceptability of mustard PPI in bologna by comparing these to a commercial soy protein product. All the bologna samples were prepared using pork trim 65/35. Other ingredients included fine salt, rapid cure, sodium erythorbate, cold cut diamond salt and dextrose. The meat was ground with all ingredients into a fine emulsion in a silent cutter, during which ice was added to keep the meat temperature below 12° C. The paste was stuffed into moisture proof casings, and steam cooked at 78° C. to an internal temperature of 70° C. Nine batches were made, containing soy or mustard protein products each at 1 and 2% level w/w, with one control containing no additional protein.

A 9-point hedonic scaling method was chosen to evaluate colour, flavour and texture of these samples. A panel was set up consisting of 10 people. Each panelists expressed a degree of liking or disliking for one sample by choosing a statement on a scale ranging from "like extremely" to "dislike extremely" with a central point of "neither like nor dislike". The samples were coded and served in identical presentation style, but the order of sample presentation was randomized. In this case, samples containing 1 and 2 wt % based on the total weight of the product additional protein products were tasted separately, with a 10-minute break in between.

Numerical scores were then given to the panelists' ratings of these samples by assigning 1 to "dislike extremely" and 9 "like extremely". The difference between two adjacent ratings was one score. The data were analyzed by ANOVA (analysis of variance) for significant differences. As shown by the results in Table 10, the mustard protein containing products could not be distinguished from the soy protein containing samples in terms of flavour, texture or colour.

TABLE 10

Results of sensory evaluation of bologna samples with mustard or soy protein[a,b]

| Product | Colour | | Taste | | Texture | |
|---|---|---|---|---|---|---|
| | 1% | 2% | 1% | 2% | 1% | 2% |
| Control[c] | 7.0 | 6.2 | 7.2 | 6.6 | 6.5 | 6.5 |
| Soy protein | 6.4 | 7.3 | 6.5 | 7.2 | 6.8 | 6.7 |
| Mustard PPI | 6.7 | 6.5 | 6.9 | 5.5 | 6.5 | 6.0 |
| Mustard SPI | 6.4 | 7.0 | 6.1 | 5.8 | 5.9 | 6.4 |
| Mustard MR | 6.3 | 6.0 | 6.0 | 5.7 | 5.7 | 6.0 |

[a]All results are means of data of 10 panelists.
[b]There is no significant difference in each column ($P < 0.05$).
[c]Contains no additional protein, hence additional levels not applicable.

Example 8

A 300 gal (~1,100 L) stainless steel tank was filled with 260 gal (990 L) water, then 122 lb (55.2 kg) defatted de-hulled mustard flour, 6.4 lb (2.9 kg) NaCl and 1.2 lb (0.55 kg) ascorbic acid were added into water and mixed. The pH of the solution was raised to ~11 by the slow addition of aqueous 30% (w/w) NaOH solution. Centrifugation separated the wet solids from the alkaline extract solution.

The liquid phase was heated to 60° C., and maintained at this temperature for 30 minutes. It was cooled to 50° C. before the membrane operation. The liquid volume was reduced to a quarter by ultrafiltration using a 10 KD MW-cutoff membrane system. The residual low molecular weight components were removed by diafiltration, with 4 diavolumes of 0.05M NaCl solution (adjusted to pH 11). The temperature of the processing solution was maintained between 48 and 50° C. during the ultrafiltration and the diafiltration.

The pH of the diafiltration retentate was lowered to 5 by the addition of 6M HCl, precipitating some of the proteins. The precipitate was removed by centrifugation. Lecithin was added to the solids at 0.75 to 1.5% by weight of solids, to improve dispersibility. The slurry was spray dried to produce the precipitated protein isolate.

The clear liquid, which contained the soluble proteins, was ultrafiltered to reduce its volume, using a concentration factor of 4 and then diafiltered with 4 diavolumes of fresh water. The retentate was combined with the solids from alkaline extraction after they were neutralized to pH ~7 by adding 6M HCl, lecithin was added to the solids at 0.75 to 1.5% by weight based on the weight of solids and then spray dried to produce a protein concentrate. The lecithin was added to the protein to improve dispersability in the final food product to which it is added.

The following analytical results were obtained:

TABLE 11

| | Mass | Protein concentration |
|---|---|---|
| Starting meal | 122 lb (55.2 kg) | 51.8% |
| Protein concentrate | 52.0 lb (17.0 kg) | 44.6 |
| Precipitated protein isolate | 26.5 lb (12.0 kg) | 91.6% |

The protein isolates were incorporated into bologna-type meat products at the 2% level. The final products were indistinguishable by an untrained panel from identical products made with 2% soy protein isolate.

Example 9

A 300 gal (~1,100 L) stainless steel tank was filled with 95 gal (360 L) water, then 44.5 lb (20.2 kg) defatted whole ground mustard seed, 2.3 lb (1.05 kg) NaCl and 0.45 lb (0.2 kg) ascorbic acid were added into water and mixed. The pH of the solution was raised to 11.0-11.2 by the slow addition of aqueous 30% (w/w) NaOH solution. Centrifugation separated the wet solids from the alkaline extract solution. The wet solids were washed with 64 gal (242 L) 0.05 M NaCl solution, and centrifuged. During the washing the pH was kept at 11.

The liquid phases were combined and heated to around 50° C. The liquid volume was reduced to a third by ultrafiltration using a 10 KD MW-cutoff membrane system. The residual low molecular weight components were removed by diafiltration, with 4 diavolumes of 0.05M NaCl solution (adjusted to pH 11).

The pH of the diafiltration retentate was lowered to 5 by the addition of 6M HCl, precipitating some of the proteins. The precipitate was recovered by centrifugation.

The precipitated solid slurry was spray dried to produce the precipitated protein isolate.

The clear liquid, which contained the soluble proteins was combined with the solids from alkaline extraction after they were neutralized to ~pH 7 by adding 6M HCl and then spray dried to produce a protein concentrate.

The following analytical results were obtained:

TABLE 12

| | Mass | Protein concentration |
|---|---|---|
| Starting meal | 44.5 lb (20.2 kg) | 44.7% |
| Protein concentrate | 15 lb (6.8 kg) | 30.8% |
| Precipitated protein isolate | 12 lb (5.4 kg) | 85.5% |

The protein isolates were incorporated into bologna-type meat products at the 2% level. The final products were indistinguishable by an untrained panel from identical products made with 2% soy protein isolate.

Example 10

In this example, a mustard protein isolate was dissolved in a commercial cola drink at a level of 1% w/v. The protein was completely dissolved, resulting in a clear, transparent, brown beverage.

Testing by an taste panel found that the protein-containing drink was acceptable in terms of taste, texture and viscosity. The final protein content was approximately 1%. Additionally, lecithin was added to the mustard protein isolate to improve dispersability of the protein in the drink.

While the present invention has been described with reference to what are presently considered to be the preferred examples, it is to be understood that the invention is not limited to the disclosed examples. To the contrary, the invention is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety.

The invention claimed is:

1. A method for preparing a drink suitable for human consumption, comprising:
   (a) providing a soluble protein isolate prepared by extracting proteins from Brassica oil seeds and obtaining an extracted solution containing protein, phenolic-protein complexes, and free phenolic compounds, treating the solution to liberate at least some phenolic compounds from the phenolic-protein complexes, separating at least a portion of the free phenolic compounds from the solution, subjecting the solution to isoelectric precipitation wherein the soluble protein isolate contains a plurality of proteins which are soluble in the solution at a selected isoelectric point and recovering at least a portion of the soluble protein isolate,
   (b) providing a liquid; and
   (c) combining the liquid and the soluble protein isolate to form the drink.

2. A method according to claim 1, wherein the soluble protein isolate provided in step (a) contains a level of phenolic compounds which produce a taste intensity suitable for use in a drink.

3. A method according to claim 1, wherein the oil seeds are selected from the group consisting of canola seeds, rapeseeds, and mustard seeds.

4. A method according to claim 3, wherein the oil seeds are mustard seeds.

5. A method according to claim 1, wherein the drink is acidic.

6. A method according to claim 1, wherein the drink is a fruit juice.

7. A method according to claim 1, wherein the drink is a carbonated soft drink.

8. A method according to claim 1, wherein the drink is a milk replacement.

9. A method according to claim 1, wherein treating the solution to liberate at least some phenolic compounds from the phenolic-protein complexes comprises (i) adding at least one salt to the solution; and/or (ii) adding a surfactant to the solution.

* * * * *